United States Patent
Szpak

(10) Patent No.: US 9,317,408 B2
(45) Date of Patent: Apr. 19, 2016

(54) SYSTEM AND METHOD FOR SYSTEMATIC ERROR INJECTION IN GENERATED CODE

(75) Inventor: Peter S. Szpak, Newton, MA (US)

(73) Assignee: THE MATHWORKS, INC., Natick, MA (US)

( * ) Notice: Subject to any disclaimer, the term of this patent is extended or adjusted under 35 U.S.C. 154(b) by 807 days.

(21) Appl. No.: 13/327,481

(22) Filed: Dec. 15, 2011

(65) Prior Publication Data

US 2013/0159964 A1 Jun. 20, 2013

(51) Int. Cl.
*G06F 9/44* (2006.01)
*G06F 11/36* (2006.01)

(52) U.S. Cl.
CPC ........ *G06F 11/3688* (2013.01); *G06F 11/3684* (2013.01); *G06F 11/3696* (2013.01)

(58) Field of Classification Search
USPC .................................................. 717/104–135
See application file for complete search history.

(56) References Cited

U.S. PATENT DOCUMENTS

| | | | |
|---|---|---|---|
| 5,581,696 A | 12/1996 | Kolawa et al. | |
| 5,995,736 A * | 11/1999 | Aleksic et al. | 716/103 |
| 7,324,931 B1 | 1/2008 | Warlock | |
| 7,392,507 B2 * | 6/2008 | Kolawa et al. | 717/124 |
| 7,689,970 B1 * | 3/2010 | Englehart | G06F 8/34 717/105 |
| 7,966,610 B2 | 6/2011 | Lin | |
| 8,418,012 B2 * | 4/2013 | Blostic | G01R 31/318364 714/741 |
| 8,448,130 B1 | 5/2013 | Pillarisetti et al. | |
| 8,504,983 B1 | 8/2013 | Englehart et al. | |
| 8,869,103 B2 | 10/2014 | Conrad et al. | |
| 8,997,039 B2 * | 3/2015 | Andrade | G06F 11/3616 717/106 |
| 2005/0120276 A1 * | 6/2005 | Kolawa et al. | 714/38 |
| 2007/0169039 A1 * | 7/2007 | Lin | 717/146 |
| 2008/0098349 A1 * | 4/2008 | Lin et al. | 717/106 |
| 2010/0287535 A1 * | 11/2010 | Kim | G06F 11/3688 717/127 |
| 2011/0302541 A1 * | 12/2011 | Yang et al. | 716/106 |
| 2012/0005650 A1 | 1/2012 | Carrick et al. | |

(Continued)

FOREIGN PATENT DOCUMENTS

WO WO-2007/049013 A1 5/2007

OTHER PUBLICATIONS

Marinescu et al. "LFI: A Practical and General Library-Level Fault Injector", Proceedings of the Intl. Conference on Dependable Systems and Networks (DSN), Jun. 2009, retrieved from <http://infoscience.epfl.ch/record/139395/files/lfi> total pages 10.*

(Continued)

*Primary Examiner* — Marina Lee
(74) *Attorney, Agent, or Firm* — Cesari and McKenna LLP; Michael R. Reinemann

(57) ABSTRACT

A system and method introduces one or more errors into computer programming code generated from a model or other source program. The one or more errors are not present in the model, but are introduced into the code generated from the model. The one or more errors may simulate one or more bugs in the code generation process. The generated code, including the one or more introduced errors, may be analyzed by one or more verification tools. The one or more verification tools examine the generated code in an effort to detect the one or more errors that were introduced. The one or more verification tools may compare the generated code to the model or source program. If the one or more verification tools is able to detect the one or more introduced errors, then the one or more verification tools may be considered to be validated.

44 Claims, 22 Drawing Sheets

(56) References Cited

U.S. PATENT DOCUMENTS

| | | | | |
|---|---|---|---|---|
| 2012/0216091 A1* | 8/2012 | Blostic | ............ | G01R 31/318364 714/741 |
| 2012/0254827 A1 | 10/2012 | Conrad et al. | | |
| 2013/0159964 A1* | 6/2013 | Szpak | ............................ | 717/105 |

OTHER PUBLICATIONS

Brillout et al. "Mutation-Based Test Case Generation for Simulink Models" Nov. 4, 2009, pp. 208-227, retrieved from <http://download.springer.com/static/pdf/514/bok%253A978-3-642-17071-3.pdf?auth66=1399411265_3fafe655fb3fa9c53f644c3a2bc95079&ext=.pdf>.*

Kolawa, Adam "Mutation Testing: A New Approach to Automatic Error-Detection", ParaSoft Corporation Software Testing, Analysis & Review May 10-14, 1999, retrieved from<http://www.stickyminds.com/sites/default/files/presentation/file/2013/99STRER_F4.pdf> total pages 29.*

Offutt et al. "Using Compiler Optimization Techniques to Detect Equivalent Mutants", Dec. 27, 1996,retrieved from <http://www.cs.gmu.edu/~offutt/rsrch/papers/mc-equiv.pdf> total pages 26.*

Brillout, Angelo et al., "Mutation-Based Test Case Generation for Simulink Models," Formal Methods for Components and Objects, Springer Berlin Heidelberg, Belin, Heidelberg, Nov. 4, 2009, pp. 1-20.

Erkkinen, Tom, et al.,"Model-Based Design for DO-178B with Qualified Tools," AIAA Modeling and Simulation Technologies Conference and Exhibit, Hyatt Regency McCormick Place, Chicago, Illinois, The MathWorks, Inc., Aug. 10-13, 2009, pp. 1-13.

Harold, Elliotte Rusty, "Test Your Tests with Jester," developerWorks, <http://www.ibm.com/developerworks/library/j-jester/>,Mar. 2005, pp. 1-12.

Smith, Ben H., et al., "An Empirical Evaluation of the MuJava Mutation Operators," Testing: Academic and Industrial Conference Practice and Research Techniques—Mutation, 2007, TAICPART-Mutation 2007, Sep. 2007, pp. 1-10.

Moore, Ivan, "Jester—a JUnit test tester.," Connextra Ltd, May 2002, pp. 84-87.

Smith, Ben, et al., "Mutation Testing with Jumble," North Carolina State University, <http://agile.csc.ncsu.edu/SEMaterials/tutorials/jumble/>, Oct. 2006, pp. 1-11.

"Mutation Testing: A New Approach to Automatic Error-Detection," Parasoft, <http://www.parasoft.com/jsp/products/article,jsp?articleId=291>, 1996-2011, Retrieved on Oct. 6, 2011, pp. 1-2.

Offutt, A. Jefferson, "An Experimental Evaluation of Data Flow and Mutation Testing," J. Software-Practice & Experience, vol. 22, Issue 2, Feb. 1996, pp. 1-14.

"Simulink® Code Inspector™: User's Guide," The MathWorks, Inc., Sep. 2011, pp. i to iv, 1-1 to 1-24, 2-1 to 2-12, 3-1 to 3-10, and 4-1 to 4-5.

Burnard, Andrew, "Verifying and Validating Automatically Generated Code," International Automotive Conference, Jun. 2004, pp. 1-8.

Arlat, Jean, et al., "Comparison of Physical and Software-Implemented Fault Injection Techniques," IEEE Transactions on Computers, vol. 52, No. 9, IEEE Computer Society, Sep. 2003, pp. 1-19.

Arlat, Jean, et al., "Fault Injection and Dependability Evaluation of Fault-Tolerant Systems," IEEE Transactions on Computers, vol. 42, No. 8, IEEE Computer Society, Aug. 1993, pp. 1-11.

Avresky, Dimiter, et al., "Fault Injection for Formal Testing of Fault Tolerance," IEEE Transactions on Reality, vol. 45, No. 3, IEEE Computer Society, Sep. 1996, pp. 1-13.

Crouzet, Yves, et al., "The Sesame Experience: from Assembly Languages to Declarative Models," Second Workshop on Mutation Analysis (Mutation 2006-ISSRE Workshops 2006) (MUTATIOn'06), IEEE Computer Society, Nov. 2006, pp. 1-10.

Crouzet, Yves, et al., "Validation Du Test Du Logiciel Par Injection De Fautes: L'outil Sesame," Actes due Ileme Colloque National de Fiabilite et Maintenabilite, Arcachon, France, Oct. 1, 1998, pp. 1-9.

"Notification Concerning Transmittal of International Preliminary Report on Patentability (Chapter 1 of the Patent Cooperation Treaty)," International Application No. PCT/US2012/068095, International Filing Date: Dec. 6, 2012, Date of Mailing: Jun. 26, 2014, pp. 1-11.

"Notification of Transmittal of the International Search Report and the Written Opinion of the International Searching Authority, or the Declaration," International Filing Date: Dec. 6, 2012, International Application No. PCT/US2012/068095, Applicant: The MathWorks, Inc., Date of Mailing: Mar. 5, 2013, pp. 1-16.

Ziade, Haissam, et al., "A Survey on Fault Injection Techniques," International Arab Journal of Information Technology, vol. 1, No. 2, Jul. 2004, pp. 1-16.

\* cited by examiner

```
35  /* Model step function */
36  void rtwdemo_counter_vec_step(void)
37  {
38    boolean_T rtb_equal_to_count;
39
40    /* Sum: '<Root>/Sum' incorporates:
41     * Constant: '<Root>/INC'
42     * UnitDelay: '<Root>/X'
43     */
44    rtDWork.X = (uint8_T)(1U + (uint32_T)rtDWork.X);
45
46    /* RelationalOperator: '<Root>/RelOpt' incorporates:
47     * Constant: '<Root>/LIMIT'
48     */
49    rtb_equal_to_count = (rtDWork.X != 16);
50
51    /* Outputs for Triggered SubSystem: '<Root>/Amplifier' incorporates:
52     * TriggerPort: '<S1>/Trigger'
53     */
54    if (rtb_equal_to_count && (rtPrevZCSigState.Amplifier_Trig_ZCE != POS_ZCSIG))
55    {
56      /* Outport: '<Root>/Output' incorporates:
57       * Gain: '<S1>/Gain'
58       * Inport: '<Root>/Input'
59       */
60      rtY.Output[0] = rtU.Input[0] << 1;
61      rtY.Output[1] = rtU.Input[1] << 1;
62      rtY.Output[2] = rtU.Input[2] << 1;
63    }
64
```

*FIG. 8A*

```
65    rtPrevZCSigState.Amplifier_Trig_ZCE = (uint8_T)(rtb_equal_to_count ? (int32_T)
66      POS_ZCSIG : (int32_T)ZERO_ZCSIG);
67
68    /* End of Outputs for SubSystem: '<Root>/Amplifier' */
69
70    /* Switch: '<Root>/Switch' incorporates:
71     *  Constant: '<Root>/RESET'
72     */
73    if (!rtb_equal_to_count) {
74      /* Update for UnitDelay: '<Root>/X' */
75      rtDWork.X = 0U;
76    }
77
78    /* End of Switch: '<Root>/Switch' */
79  }
80
81  /* Model initialize function */
82  void rtwdemo_counter_vec_initialize(void)
83  {
84    rtPrevZCSigState.Amplifier_Trig_ZCE = POS_ZCSIG;
85  }
86
87  /*
88   * File trailer for generated code.
89   *
90   * [EOF]
91   */
```

*FIG. 8B*

```
35  /* Model step function */
36  void rtwdemo_counter_vec_step(void)
37  {
38    boolean_T rtb_equal_to_count;
39
40    /* Sum: '<Root>/Sum' incorporates:
41     *  Constant: '<Root>/INC'
42     *  UnitDelay: '<Root>/X'
43     */
44    rtb_equal_to_count = (rtDWork.X != 16);
45
46    /* RelationalOperator: '<Root>/RelOpt' incorporates:
47     *  Constant: '<Root>/LIMIT'
48     */
49    rtDWork.X = (uint8_T)(1U + (uint32_T)rtDWork.X);
```

FIG. 9

```
54  if (rtb_equal_to_count && (rtPrevZCSigState.Amplifier_Trig_ZCE != POS_ZCSIG))
55  {
56    /* Outport: '<Root>/Output' incorporates:
57     *  Gain: '<S1>/Gain'
58     *  Inport: '<Root>/Input'
59     */
60    rtY.Output[0] = rtU.Input[0] >> 2;
61    rtY.Output[1] = rtU.Input[1] << 1;
62    rtY.Output[2] = rtU.Input[2] << 1;
63  }
```

FIG. 10

```
46  /* RelationalOperator: '<Root>/RelOpt' incorporates:
47   * Constant: '<Root>/LIMIT'
48   */
49  rtb_equal_to_count = (rtDWork.X != 16);
50  rtb_equal_to_count = rtDWork.X += 1;
```
— 1102

*FIG. 11*

```
46  /* RelationalOperator: '<Root>/RelOpt' incorporates:
47   * Constant: '<Root>/LIMIT'
48   */
49  if (rtDWork.X > 1) {
50          rtb_equal_to_count = (rtDWork.X != 16);
51  }
52
53  /* Outputs for Triggered SubSystem: '<Root>/Amplifier' incorporates:
54   * TriggerPort: '<S1>/Trigger'
55   */
56  if (rtb_equal_to_count && (rtPrevZCSigState.Amplifier_Trig_ZCE != POS_ZCSIG))
```

*FIG. 12*

```
46  /* RelationalOperator: '<Root>/RelOpt' incorporates:
47   * Constant: '<Root>/LIMIT'
48   */
49  rtb_equal_to_count = (rtDWork.X != 20);
```
— 1302

*FIG. 13*

```
54  if ((unit8_T) (1U + (uint32_T) rtDWork.X) &&
        (rtPrevZCSigState.Amplifier_Trig_ZCE != POS_ZCSIG))   ⎫ 1402
55  {                                                         ⎭
56    /* Outport: '<Root>/Output' incorporates:
57     *  Gain: '<S1>/Gain'
58     *  Inport: '<Root>/Input'
59     */
60    rtY.Output[0] = rtU.Input[0] << 1;
61    rtY.Output[1] = rtU.Input[1] << 1;
62    rtY.Output[2] = rtU.Input[2] << 1;
63  }
```

*FIG. 14*

```
54  if (rtb_equal_to_count && (rtPrevZCSigState.Amplifier_Trig_ZCE != POS_ZCSIG))
55  {
56    /* Outport: '<Root>/Output' incorporates:
57     *  Gain: '<S1>/Gain'
58     *  Inport: '<Root>/Input'
59     */                                    ── 1502
60    rtY.Output[0] = rtU.Input[2] << 1; ──
61    rtY.Output[1] = rtU.Input[1] << 1; ──── 1503
62    rtY.Output[2] = rtU.Input[0] << 1; ──── 1504
63  }
```

*FIG. 15*

```
33  /* Model step function for TID0 */
34  void rtwdemo_mrmtbb_step0(void)        /* Sample time: [1.0s, 0.0s] */
35  {
36    /* Update the flag to indicate when data transfers from
37     * Sample time: [1.0s, 0.0s] to Sample time: [2.0s, 0.0s] */
38    (rtM->Timing.RateInteraction.TID0_1)++;
39    if ((rtM->Timing.RateInteraction.TID0_1) > 1) {
40      rtM->Timing.RateInteraction.TID0_1 = 0;
41    }
42
43    /* RateTransition: '<Root>/RateTransition' */
44    if ((rtM->Timing.RateInteraction.TID0_1 == 1)) {
45      rtDWork.RateTransition = rtDWork.RateTransition_Buffer0;
46    }
47
48    /* Outputs for atomic SubSystem: '<Root>/SS2' */
49
50    /* Sum: '<S2>/Sum' incorporates:
51     * Gain: '<S2>/Gain'
52     * Inport: '<Root>/In1_1s'
53     */
54    rtY.Out2 = 2.0 * rtDWork.RateTransition + rtU.In1_1s;
55
56    /* end of Outputs for SubSystem: '<Root>/SS2' */
57
58    /* Outport: '<Root>/Out1' incorporates:
59     * Gain: '<S1>/Gain1'
60     * Gain: '<S1>/Gain2'
61     * Inport: '<Root>/In1_1s'
62     * Sum: '<Root>/Sum'
63     * Sum: '<S1>/Sum'
64     */
65    rtY.Out1 = (3.0 * rtDWork.RateTransition + rtU.In1_1s) * 5.0 + rtY.Out2;
66  }
67
68  /* Model step function for TID1 */
69  void rtwdemo_mrmtbb_step1(void)        /* Sample time: [2.0s, 0.0s] */
70  {
71    rtDWork.RateTransition_Buffer0 = rtDWork.Integrator_DSTATE;
72
73    /* Update for DiscreteIntegrator: '<Root>/Integrator' incorporates:
74     * Update for Inport: '<Root>/In2_2s'
75     */
76    rtDWork.Integrator_DSTATE = 2.0 * rtU.In2_2s + rtDWork.Integrator_DSTATE;
77  }
78
79  /* Model initialize function */
80  void rtwdemo_mrmtbb_initialize(void)
81  {
82    /* (no initialization code required) */
83  }
```

*FIG. 17*

```
33  /* Model step function for TID0 */
34  void rtwdemo_mrmtbb_step0(void)      /* Sample time: [1.0s, 0.0s] */
35  {
36    /* Update the flag to indicate when data transfers from
37     * Sample time: [1.0s, 0.0s] to Sample time: [2.0s, 0.0s] */
38    (rtM->Timing.RateInteraction.TID0_1)++;
39    if ((rtM->Timing.RateInteraction.TID0_1) > 1) {
40      rtM->Timing.RateInteraction.TID0_1 = 0;
41    }
42
43    /* RateTransition: '<Root>/RateTransition' */
44    if ((rtM->Timing.RateInteraction.TID0_1 == 1)) {
45      rtDWork.RateTransition = rtDWork.RateTransition_Buffer0;
46    }
47
48    /* Outputs for atomic SubSystem: '<Root>/SS2' */
49
50    /* Sum: '<S2>/Sum' incorporates:
51     *  Gain: '<S2>/Gain'
52     *  Inport: '<Root>/In1_1s'
53     */
54
55    /* end of Outputs for SubSystem: '<Root>/SS2' */
56
57    /* Outport: '<Root>/Out1' incorporates:
58     *  Gain: '<S1>/Gain1'
59     *  Gain: '<S1>/Gain2'
60     *  Inport: '<Root>/In1_1s'
61     *  Sum: '<Root>/Sum'
62     *  Sum: '<S1>/Sum'
63     */
64    rtY.Out1 = (3.0 * rtDWork.RateTransition + rtU.In1_1s) * 5.0 + rtY.Out2;
65  }
66
67  /* Model step function for TID1 */
68  void rtwdemo_mrmtbb_step1(void)      /* Sample time: [2.0s, 0.0s] */
69  {
70    rtDWork.RateTransition_Buffer0 = rtDWork.Integrator_DSTATE;
71
72    /* Update for DiscreteIntegrator: '<Root>/Integrator' incorporates:
73     *  Update for Inport: '<Root>/In2_2s'
74     */
75    rtDWork.Integrator_DSTATE = 2.0 * rtU.In2_2s + rtDWork.Integrator_DSTATE;
76    rtY.Out2 = 2.0 * rtDWork.RateTransition + rtU.In1_1s;
77  }
78
79  /* Model initialize function */
80  void rtwdemo_mrmtbb_initialize(void)
81  {
82    /* (no initialization code required) */
83  }
```

*FIG. 18*

```
37  /* External inputs (root inport */
38  typedef struct {              2002
39    int32_T In1;                        /* '<Root>/In1' */
40    int32_T In2;                        /* '<Root>/In2' */
41  } ExternalInputs;             2004
42
43  /* External outputs (root outports fed */
44  typedef struct {
45    int32_T Out1;                       /* '<Root>/Out1' */
46  } ExternalOutputs;
```

```
30  /* Model step function */
31  void missing_cast_step(void)
32  {
33    /* Outport: '<Root>/Out1' incorporates:
34     * DataTypeConversion: '<Root>/Data Type Conversion'
35     * Inport: '<Root>/In1'
36     * Inport: '<Root>/In2'
37     * Sum: '<Root>/Sum'
38     */
39    rtY.Out1 = (int8_T)(rtU.In1 + rtU.In2);
40  }
```

```
35  /* Model step function */
36  void rtwdemo_counter_vec_step(void)
37  {
38    boolean_T rtb_equal_to_count = 0;          2206
39
40    /* Sum: '<Root>/Sum' incorporates:
41     * Constant: '<Root>/INC'
42     * UnitDelay: '<Root>/X'
43     */
44    rtDWork.X = (uint8_T)(1U + (uint32_T)rtDWork.X);
45
46    /* RelationalOperator: '<Root>/RelOpt' incorporates:
47     * Constant: '<Root>/LIMIT'
48     */
49    {          2202                              2203
50      Boolean_T rtb_equal_to_count = 1;
51      rtb_equal_to_count = (rtDWork.X != 16);   2204
52    }     2205
53
54    /* Outputs for Triggered SubSystem: '<Root>/Amplifier' incorporates:
55     * TriggerPort: '<S1>/Trigger'
56     */
57    if (rtb_equal_to_count && (rtPrevZCSigState.Amplifier_Trig_ZCE != POS_ZCSIG))
58    {
59      /* Outport: '<Root>/Output' incorporates:
60       * Gain: '<S1>/Gain'
61       * Import: '<Root>/Input'
62       */
63      rtY.Output[0] = rtU.Input[0] << 1;
64      rtY.Output[1] = rtU.Input[1] << 1;
65      rtY.Output[2] = rtU.Input[2] << 1;
66    }
```

SYSTEM AND METHOD FOR SYSTEMATIC ERROR INJECTION IN GENERATED CODE

The invention description below refers to the accompanying drawings, of which:

Figure 3A:
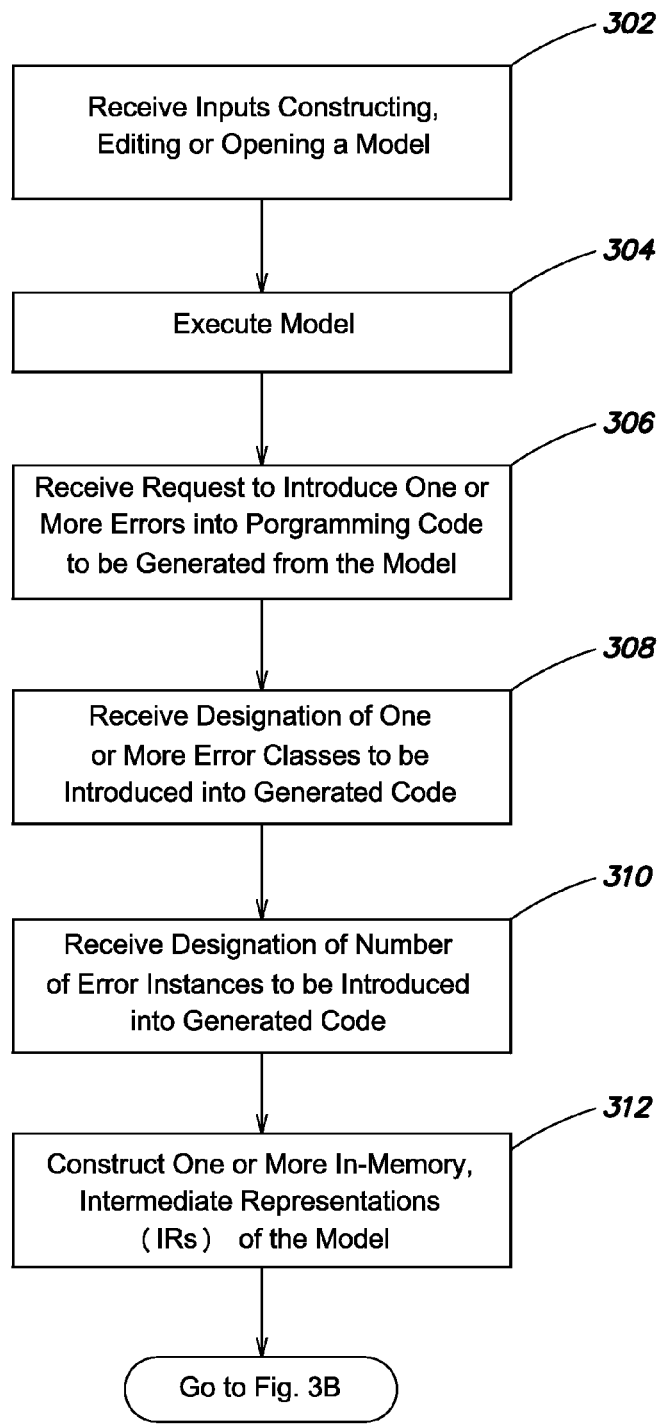
Figure 3B:
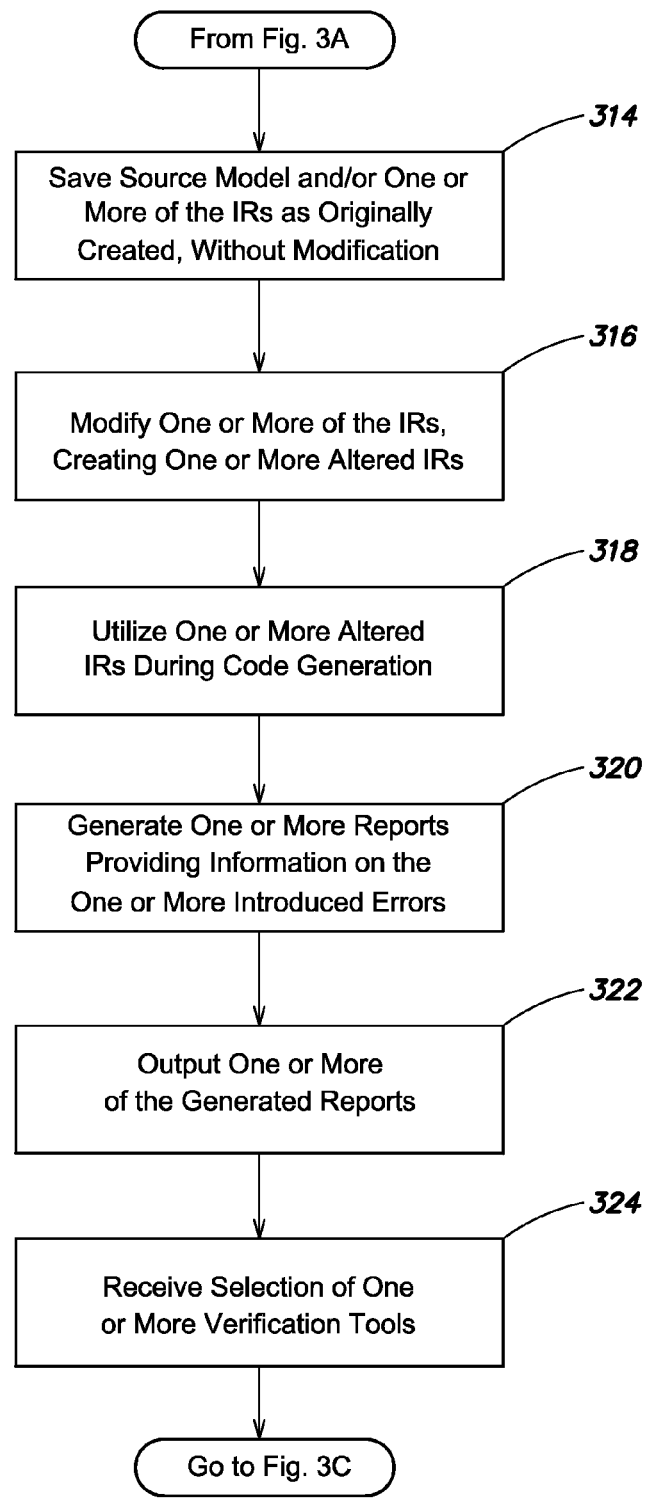
Figure 3C:
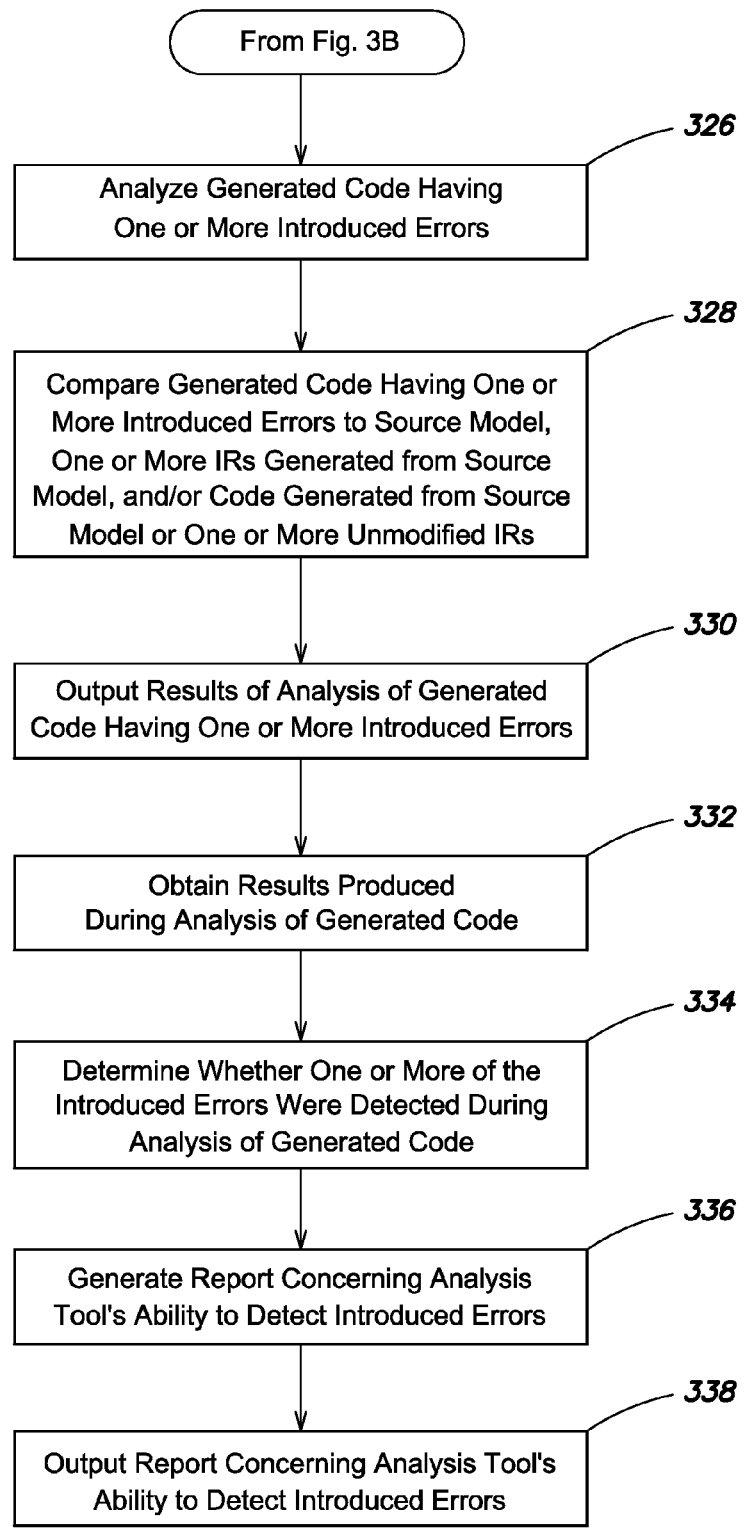
Figure 4:
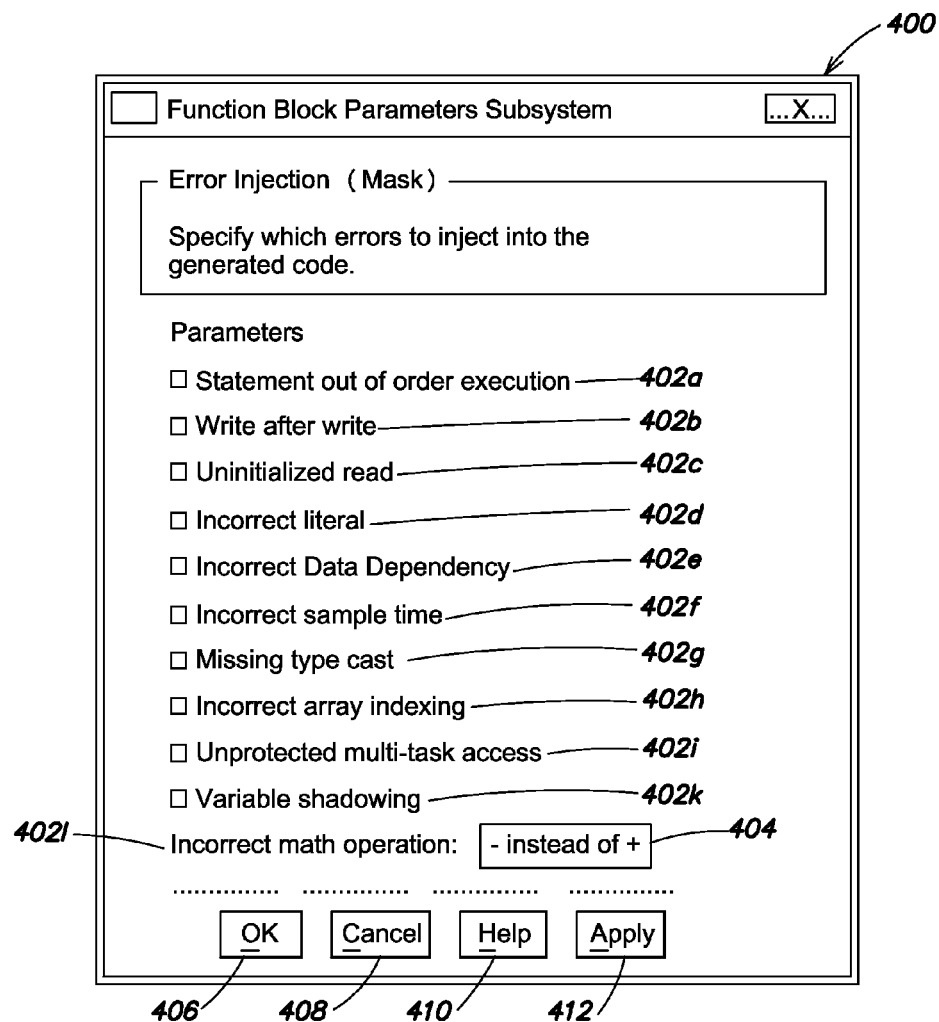
Figure 5:
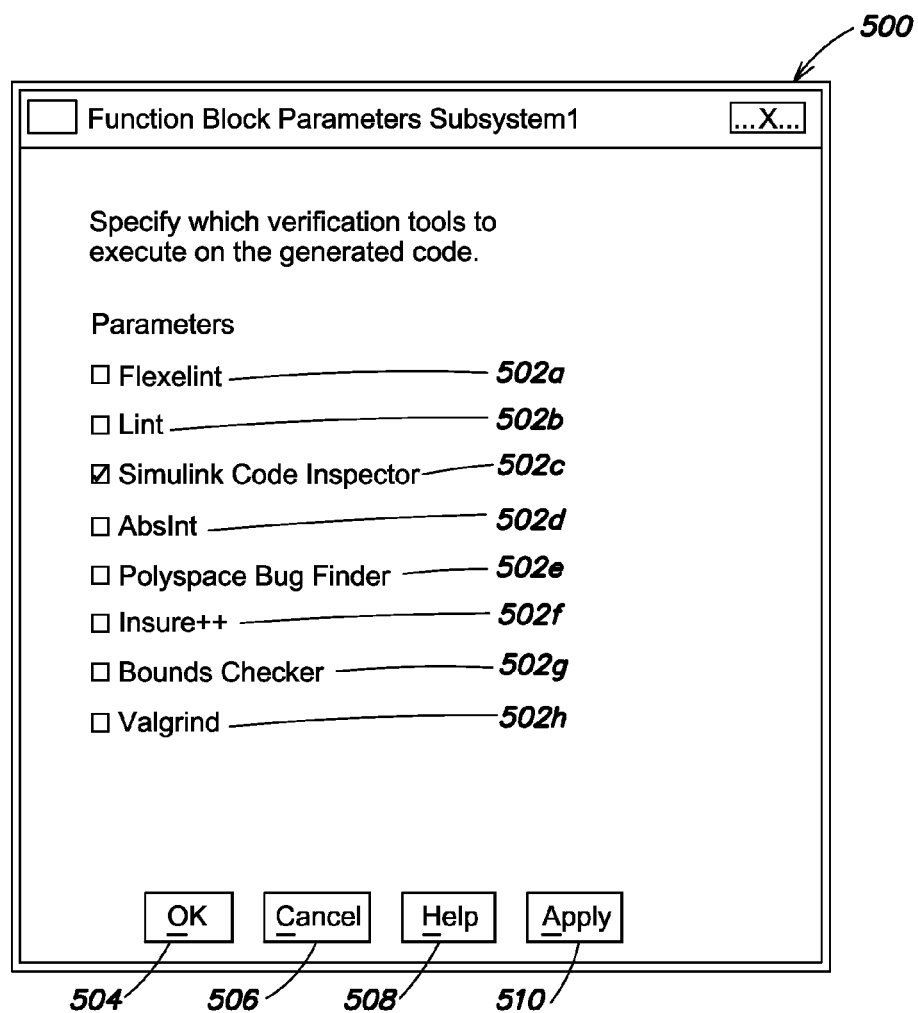
Figure 6:
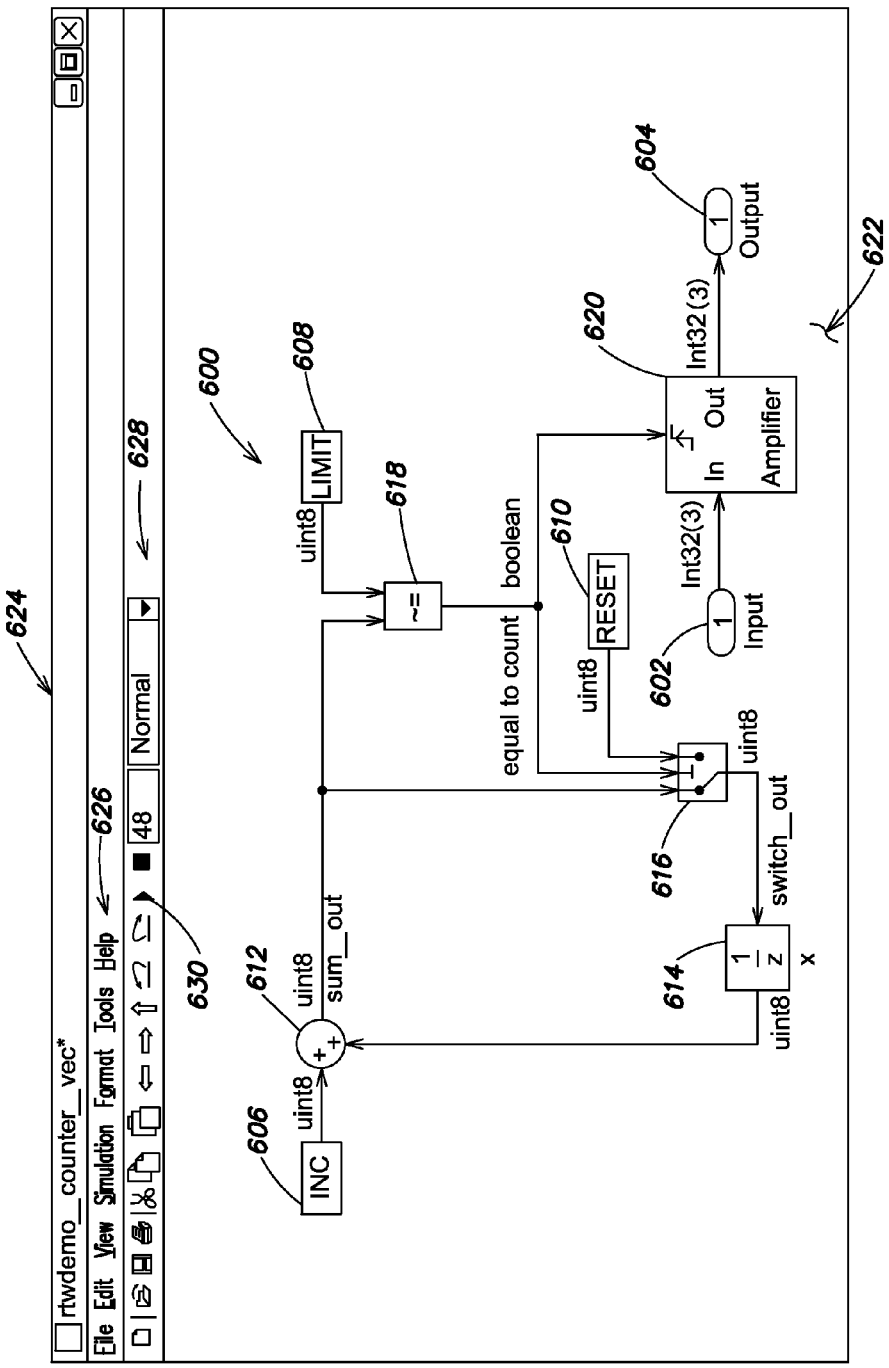
Figure 7:
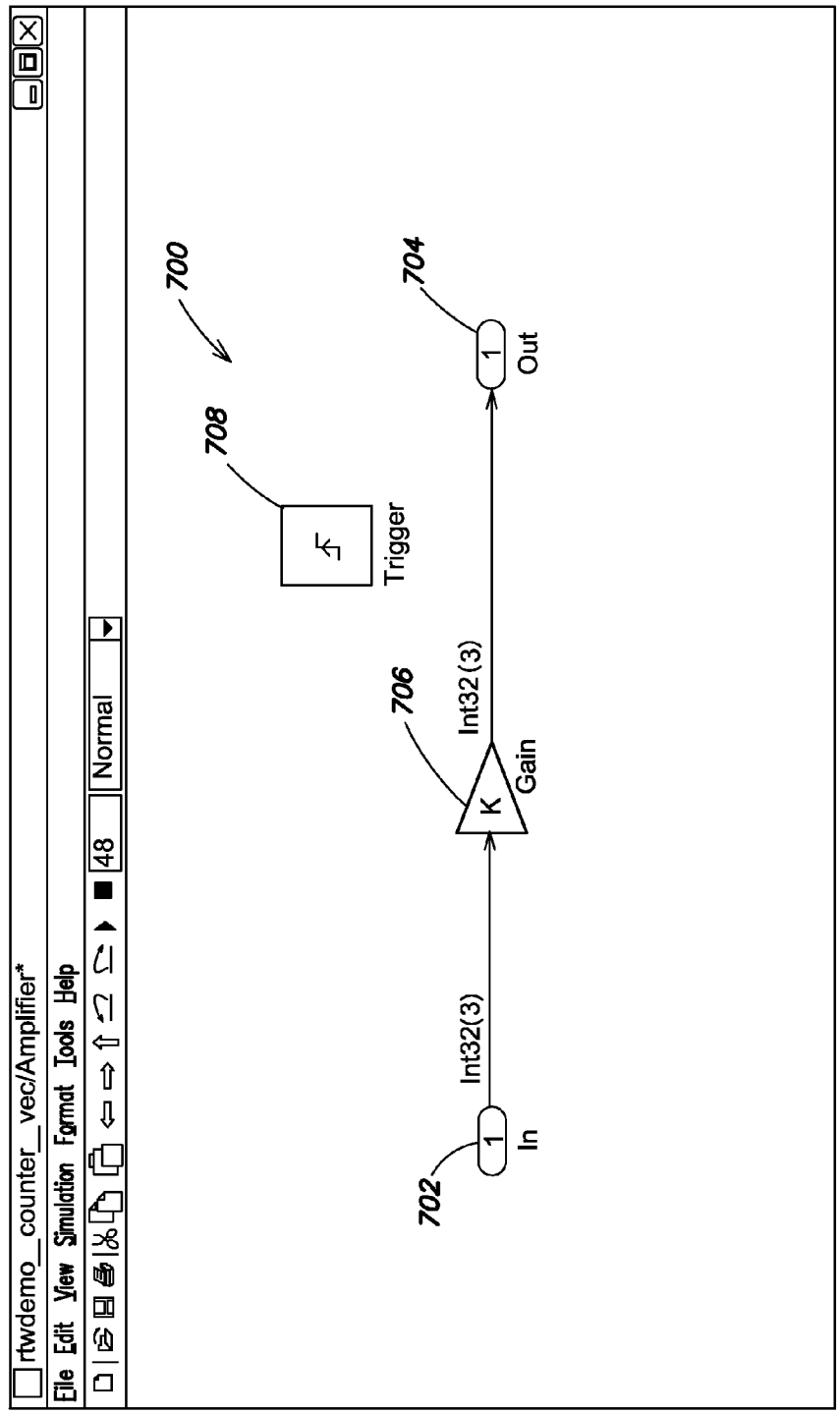
Figure 16:
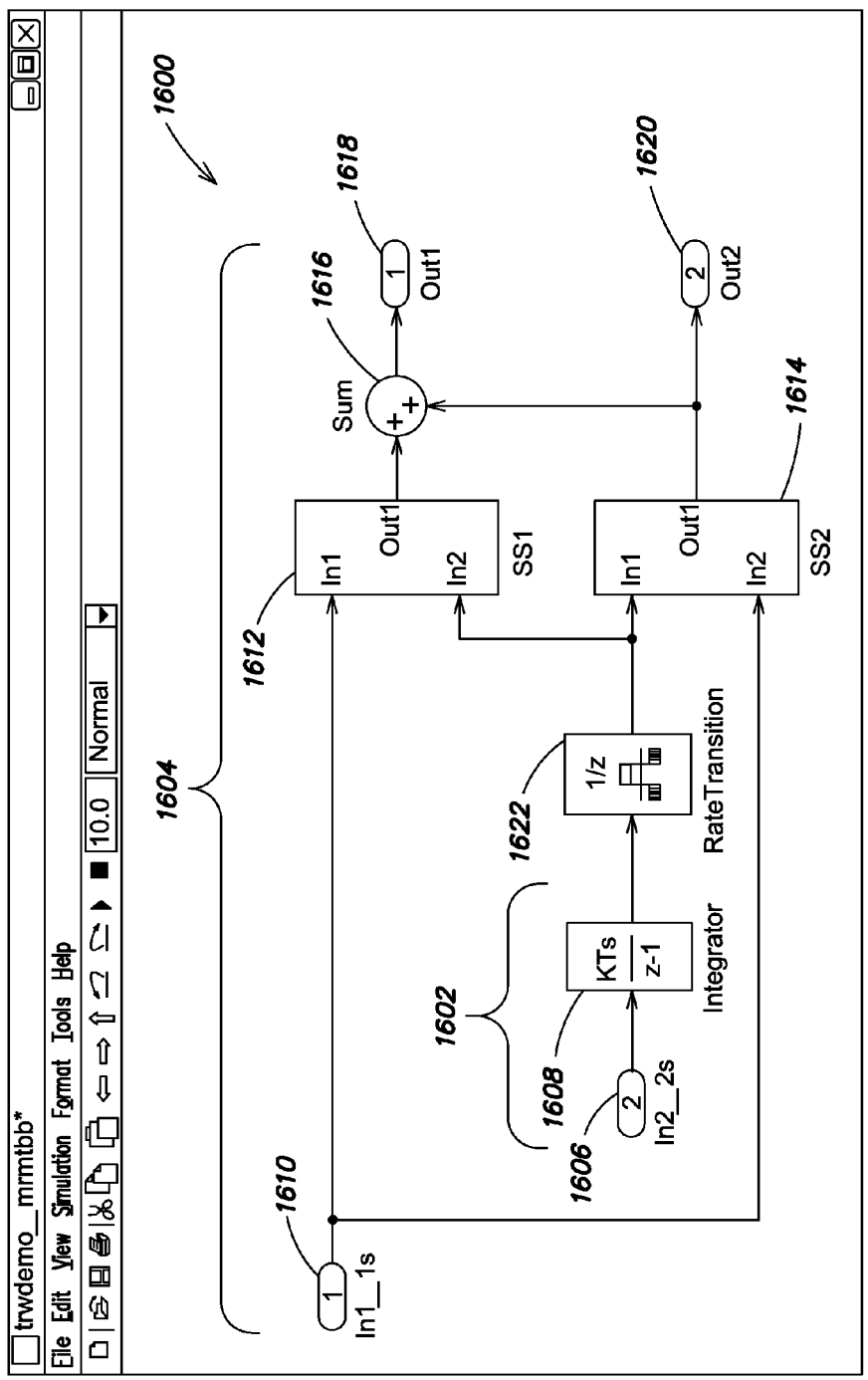
Figure 19:
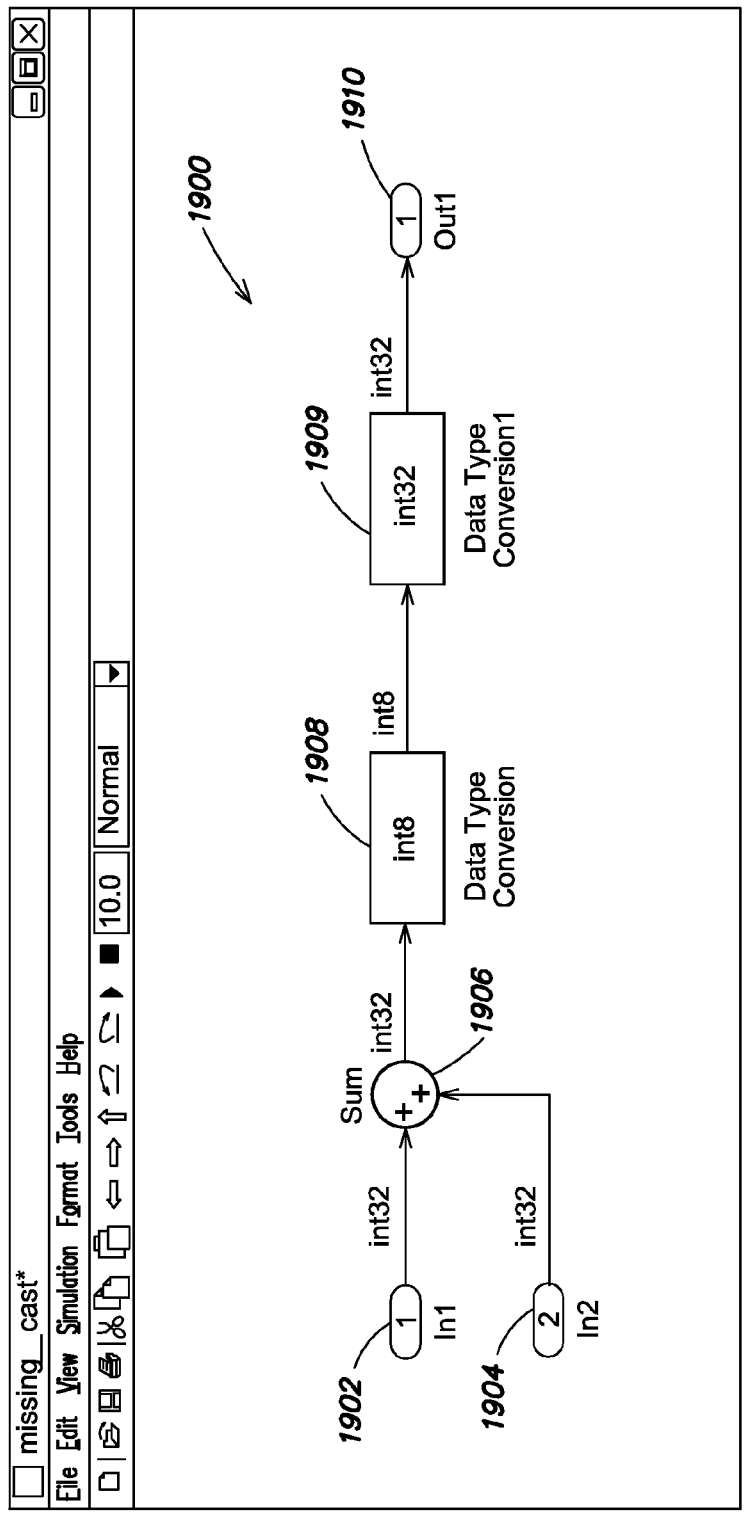
Figure 23:
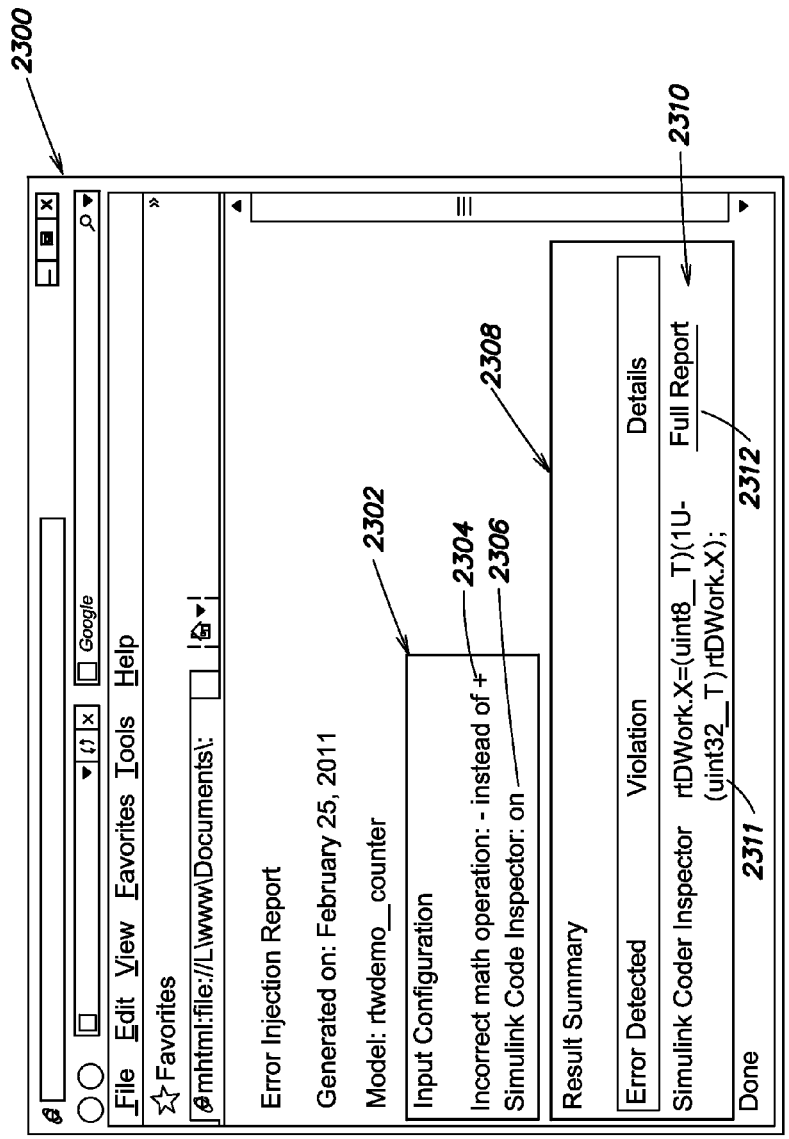

FIGS. 3A-C is a flow diagram of exemplary processing that can be used in accordance with an embodiment of the invention;

FIG. 4 is a schematic illustration of an error type selection pane in accordance with an embodiment of the invention;

FIG. 5 is a schematic illustration of a verification tool selection pane in accordance with an embodiment of the invention;

FIG. 6 is a schematic illustration of a graphical model having executable semantics;

FIG. 7 is a schematic illustration of a subsystem of the graphical model of FIG. 6;

FIGS. 8A and 8B is a partial, schematic illustration of code generated for the graphical model of FIG. 6;

FIGS. 9-15 are partial, schematic illustrations of automatically generated code having one or more introduced errors;

FIG. 16 is a schematic illustration of a graphical model having executable semantics;

FIG. 17 is a partial, schematic illustration of code generated for the graphical model of FIG. 16;

FIG. 18 is a partial, schematic illustration of automatically generated code having one or more introduced errors;

FIG. 19 is a schematic illustration of a graphical model having executable semantics;

FIGS. 20 and 21 are partial, schematic illustrations of code generated for the graphical model of FIG. 19;

FIG. 22 is a partial, schematic illustration of automatically generated code having one or more introduced errors; and FIG. 23 is a schematic illustration of a report.

DETAILED DESCRIPTION OF AN ILLUSTRATIVE EMBODIMENT

To develop or model a system, such as a dynamic system, a developer may use a programming or modeling environment. The developer may construct one or more computer-generated models of the system within the modeling environment. Exemplary systems include embedded systems, such as controllers having microprocessors, microcontrollers, and/or other programmable devices. The model may be or may include a graphical model, a block diagram, a text-based model, a state machine, an object class diagram, and a sequence diagram, among other modeling constructs. The modeling environment may include a plurality of tools, such as a simulation engine for executing the model. The modeling environment also may include an automated code generation tool for generating code from the model. The generated code may be in the form of source code that conforms to the syntax and semantics of a programming language, such as C, C++, a Hardware Description Language (HDL), etc. The generated code may be compiled or translated into machine code for execution. When executed, the generated code is intended to produce correct results, namely the same results as the model. The generated code may constitute production code, or it may be used for simulation acceleration, rapid prototyping, and hardware in the loop testing.

A code generation tool, like any complex software, however, may not be free of errors. Accordingly, the output of a code generator may contain bugs. These bugs may or may not be detected by a compiler, and they may or may not cause the generated code to produce results that differ from the model. Furthermore, the bugs occurring in the generated code due to errors in the code generation tool may not be detected by a particular verification tool used by the developer to check the generated code.

Exemplary embodiments of the present invention may be used to introduce one or more errors deliberately into computer programming code generated from a model or other source program. The generated code, including the one or more introduced errors, may then be analyzed by one or more verification tools to determine whether the verification tool can detect the occurrence of the introduced errors. In an embodiment, a system, such as a modeling environment may include a plurality of modules. In particular, the modeling environment may include a code generator module and an error injection system. The error injection system may include an error injector unit, an injected error selector, an error class library, and a report generator. The error injection system may also have an interface, such as an Application Programming Interface (API) that may be utilized by other modules to access the error injection system, e.g., for configuration, reporting, and other purposes.

The error class library may include definitions of a one or more error classes or types, one or more error class may be selected, e.g., by the user, for introduction into the generated code during the code generation process. Exemplary error classes include statement out of order execution, incorrect translation of a math operation, write after write operation, uninitialized read, etc. The user may select one or more error classes to be introduced into the general code. The user may also select the number of instances of a selected error class to be introduced into the generated code.

During the code generation process, the error injection system may introduce one or more errors of the one or more selected error classes into the code generated from the model. In an embodiment, the one or more errors may be introduced as the code is being generated for the model. For example, the code generator may construct one or more in-memory, intermediate representations (IRs) of the model. The IR may be functionally equivalent to the model. The error injection system may alter the IR so as to deliberately inject one or more errors according to the one or more error classes that were selected. In particular, the error injector unit may search the IR for suitable locations for injecting the one or more errors. The error class library may include one or more templates or patterns for use by the error injector unit to find and identify locations within the IR for the introduction of the one or more errors. The error class library may further include templates or samples for use by the error injector unit in constructing the one or more errors being introduced.

The code generator may utilize the altered IR in performing further code generation processes. The code generator outputs generated code, which includes one or more introduced errors. The report generator of the error injection system may generate one or more reports that specify the locations and provide other information about the one or more errors introduced into the generated code.

The system may also include or have access to a verification tool suite that includes one or more verification tools for testing computer programming code. The user may select one or more of the verification tools from the suite for testing the generated code that includes the one or more introduced errors. Other embodiments may select one or more verification tools programmatically, e.g., based on one or more characteristics of the generated code. In an embodiment, the user may examine the output of the selected verification tool and, utilizing information from the report, determine whether the verification tool detected the one or more errors introduced into the generated code. In another embodiment, the error injection system may obtain the output produced by the selected verification tool, and the error injection system may automatically determine whether or not the verification tool detected the one or more introduced errors. The error injection system may then report its findings to the user. Accordingly, the suitability of the verification tool for identifying such error classes may be determined.

Figure 1:
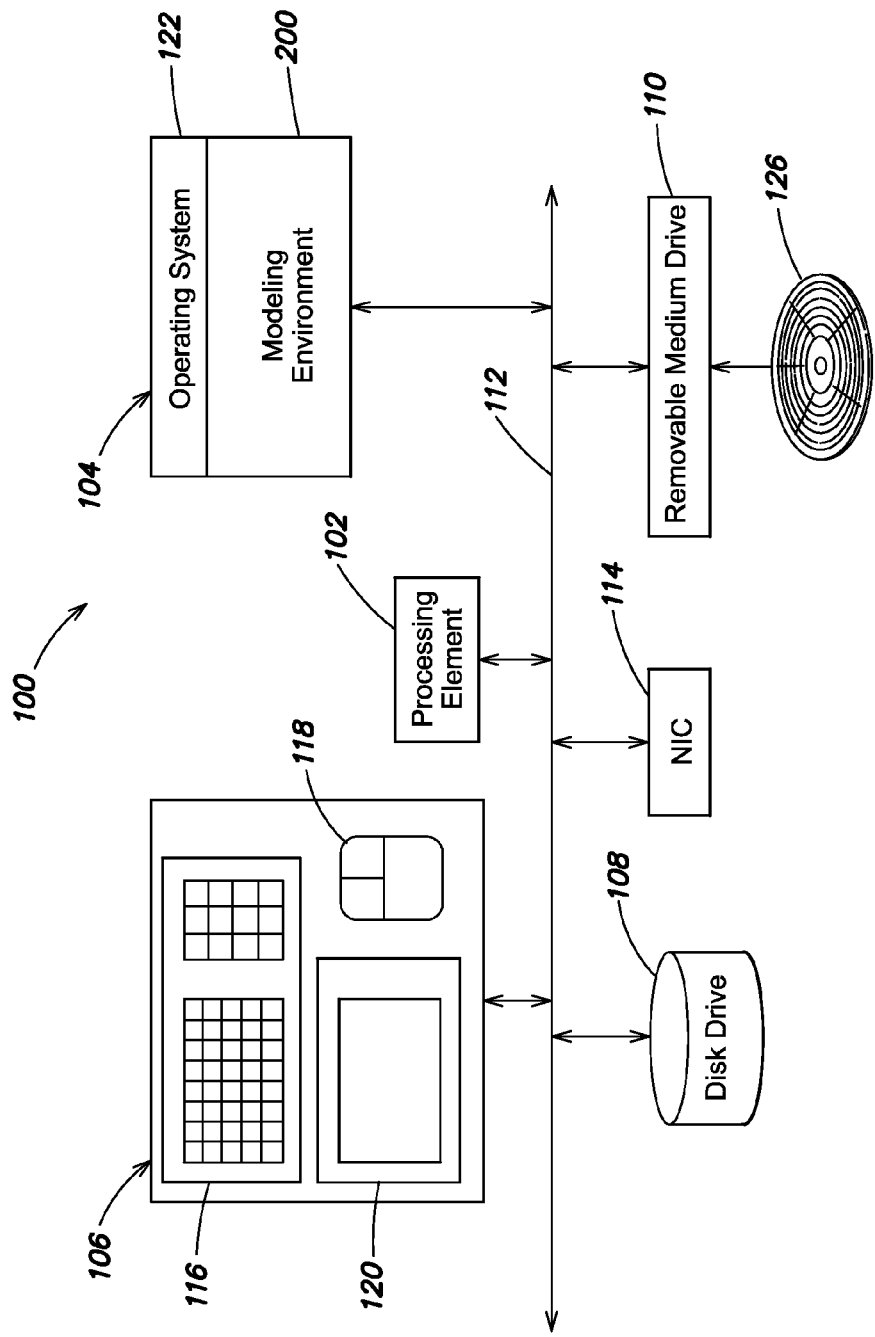
FIG. 1 is a schematic illustration of a data processing system.

FIG. 1 is a schematic illustration of a computer or data processing system 100 for implementing and utilizing an embodiment of the invention. The computer system 100 includes one or more processing elements, such as a processing element 102, a main memory 104, user input/output (I/O) 106, a data storage unit, such as a disk drive 108, and a removable medium drive 110 that are interconnected by a system bus 112. The computer system 100 may also include a communication unit, such as a network interface card (NIC) 114. The user I/O 106 may include a keyboard 116, a pointing device, such as a mouse 118, and a display 120. Exemplary processing elements include single or multi-core Central Processing Units (CPUs), Graphics Processing Units (GPUs), Field Programmable Gate Arrays (FPGAs), Application Specific Integrated Circuits (ASICs), etc.

The main memory 104 may store a plurality of libraries or modules, such as an operating system 122, and one or more applications running on top of the operating system 122, including a high-level modeling environment 200.

The removable medium drive 110 may accept and read a computer readable medium 126, such as a CD, DVD, floppy disk, solid state drive, tape, flash memory or other medium. The removable medium drive 110 may also write to the computer readable medium 126.

Suitable computer systems include personal computers (PCs), workstations, laptops, tablets, palm computers and other portable computing devices, etc. Nonetheless, those skilled in the art will understand that the computer system 100 of FIG. 1 is intended for illustrative purposes only, and that the present invention may be used with other computer systems, data processing systems or computational devices. The present invention may also be used in a networked, e.g., client-server, computer architecture, or a public and/or private cloud computing arrangement.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating system, among others.

As indicated above, a user or developer, such as an engineer, scientist, programmer, etc., may utilize the keyboard 116, the mouse 118, and the display 120 to operate the high-level modeling environment 200, and construct one or more models of a system that is being designed.

In an embodiment, suitable high-level modeling or design environments include the MATLAB® and SIMULINK® technical computing environments from The MathWorks, Inc. of Natick, Mass., the Stateflow charting tool from The MathWorks, Inc., the LabVIEW programming system from National Instruments Corp. of Austin, Tex., the Visual Engineering Environment (VEE) from Agilent Technologies, Inc. of Santa Clara, Calif., a Unified Modeling Language (UML) system, a Systems Modeling Language (SysML) system, the System Generator System from Xilinx, Inc. of San Jose, Calif., and the graphical modeling system described in U.S. Pat. No. 7,324,931 for Conversion of Model Components Into References, which is hereby incorporated by reference in its entirety, among others. The high-level modeling environment may operate at a level that is higher than certain programming languages, such as the C, C++, C#, SystemC programming languages.

Those skilled in the art will understand that the MATLAB® technical computing environment is a math-oriented, textual programming environment for digital signal processing (DSP) design, among other uses. The SIMULINK® technical computing environment is a graphical, block-based environment for modeling and simulating dynamic systems, among other uses. A model may be a time-based, block diagram model that inherits data types, sample times, and data dimensions. The model may have dynamic typing, execution order inferencing, and may support array-based operations.

In another embodiment, a lower level programming language, such as the C, C++, and C# programming languages, among others, may be used to create the model instead of a high-level modeling environment.

Figure 2:
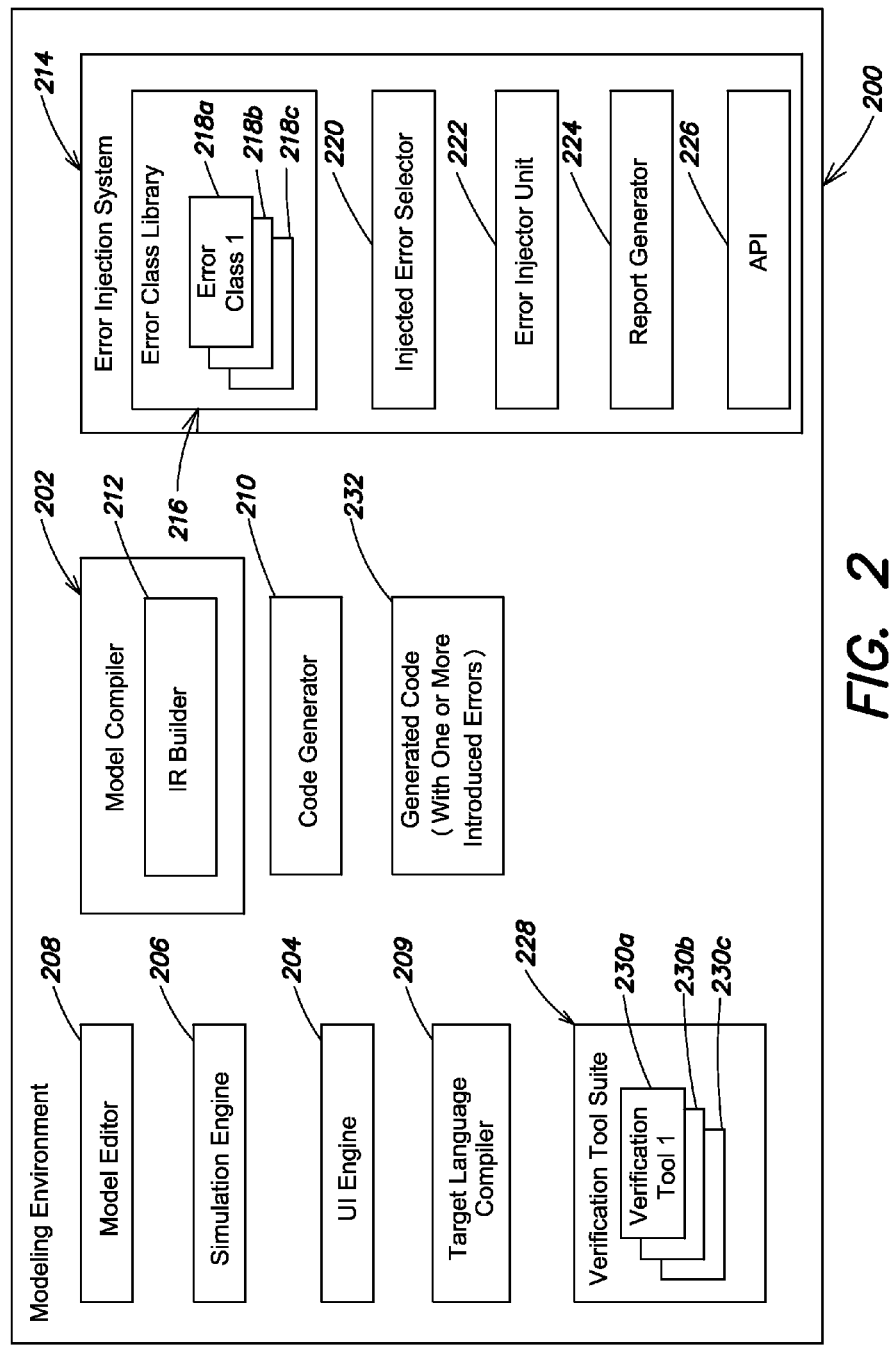
FIG. 2 is a partial functional diagram of a modeling environment.

FIG. 2 is partial block diagram of an embodiment of the high-level modeling environment 200. The environment 200 may include a model compiler 202, a user interface (UI) engine 204, a simulation engine 206, a model editor 208, a target language compiler 209, and a code generator 210. The model compiler 202 may include one or more Intermediate Representation (IR) builders, such as IR builder 212.

In an embodiment, an error injection system 214 may be integrated with the high-level modeling environment 200. For example, the error injection system 214 may be implemented as an add-on tool to the environment 200, or it may be built-into the environment 200 or the code generator 210, among other options. Alternatively, the error injection system 214 may be separate from the modeling environment 200, but in communicating relationship with it. The error injection system 214 may include a plurality of components or modules. In particular, the system 214 may include an error class library 216 having one more error classes 218a-c, an injected error selector 220, an error injector unit 222, and a report generator 224. The error injection system 214 may also have an Application Programming Interface (API) 226 for use in communicating with the system 214.

The high-level modeling environment 200 also may include a verification tool suite 228 having one or more verification tools, such as tools 230a-c. Alternatively, the verification tools 230 may be separate from the high-level modeling environment 200.

In an embodiment, the modeling environment 200 may receive inputs by a user as the user creates, edits, revises, and/or opens one or more models, which may be stored in main memory 104 or persistent memory 108. For example, the user may select a plurality of graphical objects, such as icons or blocks, from one or more libraries or palettes of pre-defined objects, and place the selected objects onto a model canvas that may be managed by the model editor 208. The user also may employ a connection tool to establish connections among the blocks, which may or may not be visually represented on the model canvas. The graphical objects of the model may represent dynamic systems, computations, functions, operations, or states, and the connections, which may appear as wires or arrows, among the objects may represent data, control, signals, events, or mathematical relationships among those dynamic systems, computations, functions, operations, or states. A set of interconnected blocks may be organized into a subsystem, and a set of states may be organized into a subchart. A model may also include one or more sub-models.

In particular, the UI engine 204 and model editor 208 may provide or support a graphical user interface (GUI) that includes the model canvas for displaying a model. The model may be a Simulink model, a Stateflow chart, a LabVIEW block diagram, a VEE diagram, a MATLAB file, a MatrixX model, etc. The model may represent a dynamic system, such as an aircraft flight controller, an engine control unit (ECU), an embedded system, etc. The simulation engine 206 may simulate the modeled system, e.g., it may execute the model.

The GUI may also include a plurality of command buttons, including a Run button, that may be selected by the user. The UI engine 204 may also provide or support a Command Line Interface (CLI) that may receive a text-based run command entered by the user. In response to the user selecting the Run button or entering the run command, the simulation engine 206 may execute or simulate the graphical model, and may output the results produced by the model's execution, for example, to the user via the display 120.

The UI engine 204 may also provide or support a Code Generation button in the GUI that may be selected by the user, or the UI engine 204 may receive a code generation command entered by the user, e.g., in the GUI or the CLI. The code generation command also may be invoked programmatically, for example, when a particular event occurs, such as a model passing verification, etc. In response to the code generation command being activated, the code generator 210 may generate code for the model, and may store the generated code in memory. In an embodiment, the generated code may be textual code, such as textual source code, that may be compiled and executed on a target machine or device. The generated code may conform to one or more programming languages, such as C, C++, C#, SystemC, VHDL, Verilog, embedded MATLAB, a vendor or target specific HDL code, such as Xilinx FPGA libraries, etc.

Suitable code generators for use with the present invention include, but are not limited to, the Simulink Coder, the Embedded Coder, and the Simulink HDL Coder products from The MathWorks, Inc., and the TargetLink product from dSpace GmbH of Paderborn Germany. Suitable verification tools for use with the present invention include, but are not limited to, the Simulink Design Verifier, the Simulink Code Inspector, and the Simulink Verification and Validation products from The MathWorks, Inc. Other verification tools include the Rational® Purify® dynamic software analysis tool from IBM of Armonk, N.Y., the Embedded Validator product from BTC Embedded Systems AG of Oldenburg Germany, and tools for determining compliance with a coding standard, such as the Joint Strike Force C++ coding standard (JSF++), the Motor Industry Software Reliability Association (MISRA) C and C++ standards, e.g., MISRA C: 2004, and MISRA C++: 2008. The Polyspace code analysis product from The MathWorks, Inc., for example, can be used to check for compliance with the MISRA C: 2004, MISRA C++: 2008, and JSF++: 2005 coding standards. Those skilled in the art will understand that other code generation systems and verification tools may be used.

The injected error selector 220, the error injector unit 222, and the report generator 224 of the error injection system 214 may each comprise registers and combinational logic configured and arranged to produce sequential logic circuits. In an embodiment, the injected error selector 220, the error injector unit 222, and the report generator 224 may be implemented through one or more software modules or libraries containing program instructions pertaining to the methods described herein. The software modules may be stored on main memory 104 and/or computer readable media, such as computer readable medium 126, and executable by one or more processing elements, such as processing element 102. Other computer readable media may also be used to store and execute these program instructions. In alternative embodiments, various combinations of software and hardware, including firmware, may be utilized to implement the present invention.

FIGS. 3A-C is a flow diagram of exemplary processing in accordance with an embodiment of the invention. The modeling environment 200 may receive inputs from a user constructing, editing or opening a model, as indicated at block 302. The environment 200 may support the creation of graphical, text-based, or a combination of graphical and text-based models. The user may operate and interact with the environment 200 through the user I/O 106, such as the keyboard 116, mouse 118, and display 120. For example, the UI engine 204 may present a model editor on the display 120. The model editor may include a menu bar, a tool bar, a canvas, and one or more libraries or palettes of available blocks. The user may select one or more blocks from one or more libraries or palettes, and place them on the canvas, for example, through drag-and-drop operations. The user may then connect the blocks, e.g., with connectors, such as lines or arrows, thereby establishing mathematical or other relationships among the blocks displayed on the canvas. In response to the user inputs, the model editor 208 may build a model that may be presented to the user, for example, on the display 120.

The graphical model may be executed by the simulation engine 206, as indicated at block 304. For example, a user may select the Run button presented by the UI engine, or enter a text-based command. A model may also be executed programmatically. Model execution may include a compile stage, a link stage, and a simulation loop stage. The compile and link stages may be performed by the model compiler 208 of the simulation engine 206. The compile stage may involve preparing data structures and evaluating parameters, configuring and propagating block characteristics, determining block connectivity, performing block reduction and block insertion, and generating a sorted order of the equations corresponding to the individual blocks of the model. One or more in memory representations, such as intermediate representations (IRs), may be generated for the model by the IR builder 212. The link stage may involve memory allocation, and generation of a block method execution list from the sorted order. During the simulation loop stage, the compiled and linked version of the model may be directly utilized by the simulation engine 206 to execute the model in an interpreted mode.

In an embodiment, at least one of the IRs may be in the form of a hierarchical, Data Flow Graph (DFG) having a plurality of nodes interconnected by edges. The nodes of the IR may represent blocks from the executable graphical model, the edges of the IR, called signals, may represent the connections between the blocks of the model. Special nodes, called network instance components (NICs), may be used to provide hierarchy in the IR, for example, by abstractly representing subsystems of the model. Thus, each block or subsystem of the model may map to one or more nodes of the IR, and each line or arrow of the model may map to one or more edges of the IR.

In an embodiment, the in-memory representation may have a plurality of hierarchically arranged levels. More specifically, the IR may be a top-level of the in-memory representation of the model and one or more of the components of the IR may be a particular type or form of in-memory representation. For example, one or more components of the IR may be a Control Flow Graph (CFG), Control Data Flow Graph (CDFG), program structure tree (PST), abstract syntax tree (AST), a netlist, etc. A CDFG may capture the control flow as well as the data flow of a graphical model through data dependency and control dependency edges.

The in-memory representation or IR may be stored in memory, such as main memory 104.

Model execution may be carried out for one or more inputs, such as a set of inputs, and may produce one or more results or outputs, such as a set of outputs. Model execution may take place over a time-span. For example, execution may begin at a start time, include one or more time steps, and end at a stop time. The results produced during model execution may be saved for later analysis, such as a comparison with results produced by code generated for the model.

To generate code from the model, a user may select a code generation command button presented by the UI engine. Alternatively, the user may enter a text command to generate code for the model, or code generation may occur or at least begin programmatically. In an embodiment, before launching the code generation process for the model, one or more code generation parameters or options may be selected for the model, and one or more code generation parameters or options may be selected for one or more objects of the model, such as one or more subsystems.

For example, the UI engine 204 may present a Model Code Generation pane on the display 120. The Model Code Generation pane may include one or more options whose value may be selected by the user, e.g., through graphical widgets, such as checkboxes, radio buttons, drop down menus, etc. A first option may specify the programming language of the code to be generated from the model, such as C, C++, C#, Ada, HDL, etc. Another option may specify a code generation objective, such as execution efficient, Read Only Memory efficient, Random Access Memory efficient, etc. Another option may specify the type of code to be generated, such as normal code and instrumented code. Instrumented code may include features that make debugging the code easier.

Code generation may include a compile stage and a link stage, as described above. The compiled and linked version of the model may be translated into code conforming to the syntax and semantics of the specified target language. The generated code may be in the format of the designated target language. Alternatively or additionally, the generated code may be in the form of object code or machine instructions, such as an executable, suitable for execution by a target device, such as a central processing unit, a microprocessor, a digital signal processor, a programmable hardware device, etc. The generated code may be in the form of a hardware description, for example, a Hardware Description Language (HDL), such as VHDL, Verilog, a netlist, or a Register Transfer Level (RTL) description. The hardware description may be utilized by one or more synthesis tools to configure a programmable hardware device, such as Programmable Logic Devices (PLDs), Field Programmable Gate Arrays (FPGAs), and Application Specific Integrated Circuits (ASICs), among others.

The code generator 210 may apply one or more optimizations during the code generation process. For example, the code generator 210 may roll or unroll For Loops, inline or reuse functions, store signals in reusable memory locations, and remove superfluous temporary variables, among other optimizations. One or more of the optimizations may be user-selected, e.g., on the Model Code Generation pane. For example, the user may select one or more code reuse options, expression folding options, dead path elimination options, etc.

As part of the code generation process, the code generator 210 may generate a plurality of code modules, such a model header file (model.h), a model source file (model.c), and one or more header and source files for one or more non-inlined portions of the model, such as non-inlined subsystems. Header files may define data types, data structures, and macros required by the generated code. For example, model.h may declare model data structures and a public interface to the model entry points and data structures.

In an embodiment, a user may create a main.c file to execute the generated code in a desired manner. Specifically, the main.c file may call top-level model functions to execute the model.

Other code modules or files may also be created such as one or more make files (model.mk), which may be used to build an executable from the source files.

The generated code may be stored in memory, such as main memory 104 or disk storage 108. The generated code also may be executed producing code generated results.

Error Injection

The error injection system 214 may receive a request, e.g., from the user, to introduce one or more errors into the code generated from the model, as indicated at block 306. For example, the Model Code Generation pane may include an option that may be selected in order to cause the error injection system 214 to introduce one or more errors into the generated code. The one or more errors may be introduced as part of the code generation process. The one or more errors being introduced are errors that do not exist in the original model. Instead, the errors that are being introduced deliberately into the generated code may represent errors that might possibly occur as a result of a bug in the code generation unit. Accordingly, the generated code, including the one or more deliberately introduced errors, is purposefully not a faithful representation of the model. Nonetheless, the generated code, including the one or more introduced errors, may be valid and executable code according to the semantics and syntax of the target language, such as the C programming language.

In particular, the error injection system 214 may receive a designation of one or more classes of errors to be introduced into the generated code, as indicated at block 308. In an embodiment, if the user selects the option to introduce one or more errors into the generated code in the Model Code Generation pane, the injected error selector 220 may cooperate with the UI engine 204 to present a sub-pane or dialog box on the display 120. FIG. 4 is an illustration of an error selection pane 400 that may be presented on the display 120. The error selection pane 400 may include a plurality of entries, such as entries 402a-1. Each entry 402 may correspond to a particular class or type of error to be introduced into the generated code. The error classes presented in error selection pane 400 may correspond to the error classes 218 stored in the error class library 216.

Exemplary error classes may include:
  statement out of order execution 402a—in which the execution order of two or more statements in the generated code is changed from the execution order specified in the model;
  write after write 402b—in which a write to a variable is followed in the generated code by another write to the variable before that variable is read;
  uninitialized read 402c—in which a variable is read in the generated code before the variable is initialized;
  incorrect literal 402d—in which the value of a literal or constant in the generated code is changed from the value in the model;
  incorrect data dependency 402e—in which the input data dependency of a component of the generated code is changed from the input data dependency specified in the model;

incorrect sample time 402f—in which the sample time of a component of the generated code is changed from the sample time specified in the model;

missing type cast 402g—in which the data type of a variable in the generated code is changed from the data type specified in the model;

incorrect array indexing 402h—in which the index into an array in the generated code is changed from the index specified in the model;

unprotected multi-task access 402i—in which the protection over a resource, such as a global variable, shared by multiple tasks in the model is omitted in the generated code;

variable shadowing 402k—in which a variable declared within a certain scope has the same name as a variable in an outer scope; and incorrect math operation 402l—in which a math operation specified in the model is changed to a different math operation in the generated code.

It should be understood that other error classes, such as memory leaks, also may be included.

A checkbox may be associated with each entry 402 presented in the error selection pane 400. The user may select one or more error classes by selecting the respective checkbox in the error selection pane 400, for example, with the mouse 118. In addition, one or more entries 402 may include a drop down menu or other graphical widget that may provide further options. For example, the incorrect math operation entry 402l may have a drop down menu 404, which may be used to select the particular type of incorrect math operation, such as inserting a subtraction operation instead of an addition operation, inserting a multiplication operation instead of a division operation, etc.

The classes of errors that are available for selection may be stored in the error class library 216 of the error injection system 214.

The error selection pane 400 may also include one or more command buttons, such as an OK button 406, a Cancel button 408, a Help button 410, and an Apply button 412. After checking the checkboxes for the desired error or errors, a user may select the Apply button 412 and the OK button 406 to save the selection.

In an embodiment, the user may also select the number of instances of an error of a selected error class to be introduced into the generated code, as indicated at block 310. For example, one or more entries 402 of the error selection pane 400 may include a data entry field for receiving a specified number of error instances of the respective class that are to be introduced into the generated code. A user may enter a desired value into one or more of the number of errors fields. In an embodiment, the number of errors for one or more of the selected error classes may be determined programmatically by the error injection system 214, rather than being designated by a user. For example, the number of error instances introduced into the generated code may be randomly determined by the error injector unit 222. For example, the error injector unit 222 may choose to introduce the first possible occurrence that represents the class of error in question, or perhaps the last. In another example, the error injection unit 222 may retain state information, such as a universally unique identifier (UUID) of the model object corresponding to the operation in the generated code so as to not repeat the same error as injected previously. In yet another example, the error injector unit 222 may choose a location where the measured cyclomatic complexity of the generated code is highest for introducing one or more errors. Cyclomatic complexity is a measure of the structural complexity of a model. It may approximate the McCabe complexity measure for code generated from a model. The McCabe complexity measure may be slightly higher on generated code due to error checks that the model coverage analysis may not consider.

A scope for one or more of the errors to be introduced may also be specified, where the specified scope is less than the entire model. For example, a user may specify that the one or more error instances of a given error class be introduced in only a portion of a model, such as a subsystem or a sub-model within the model. In response the error injector unit 222 may limit the introduction of errors to the portion of the generated code that corresponds to the specified scope, for example the subsystem, sub-model or other model portion that was specified.

During the code generation process, the error injection system 214 interfaces to and cooperates with the code generator 210 to introduce one or more instances of errors of the one or more selected error classes into the code as it is generated from the model. Specifically, the IR builder 212 of the compiler 202 may construct one or more in-memory, intermediate representations (IRs) from the model, as indicated at block 312.

The model editor 208 may save the model as originally constructed or opened, as indicated at block 314 (FIG. 3B). The model compiler 202 may save one or more of the IRs or other in-memory representations of the model as originally created, i.e., without any modification or alteration, as also indicated at block 314. The original model and one or more IRs may be saved in main memory 104 and/or in persistent memory 108.

In an embodiment, the error injection system 214 may create a copy of one or more of the IRs constructed by the IR builder 212 from the model, and may introduce one or more error instances by modifying the copy of the IR. The error injector unit 222 may alter the IR that was constructed for the model (or a copy thereof) to include one or more errors of the selected error classes, as indicated at block 316. Specifically, the error injector unit 222 may search the IR (or the copy thereof) for a particular structure, pattern, or entry. The particular pattern that is searched for may depend on the class of error being introduced. Upon locating an occurrence of the particular pattern in the IR, the error injector unit 222 may then alter the IR to introduce the error, thereby creating an altered IR. For example, the error injector unit 222 may replace all or part of the particular pattern located in the IR with a different structure or pattern, thereby altering the original IR. Additionally or alternatively, the error injector unit 222 may add or modify a statement or entry in the generated code before or after the location matching the particular pattern. By operating on a copy of the IR, both an original and an altered IR (and/or in-memory representation) may be separately saved and stored.

In an embodiment, the error injector unit 222 or the error injection system 214 may include one or more tools for tracing portions of the IR or generated code back to the model for which code is being generated. By tracing which portions of the IR and/or generated code correspond to parts of the model, the error injector unit 222 may determine where to introduce one or more errors in the generated code, and the format of the one or more errors being introduced.

A suitable tool for tracing portions of the IR and/or generated code to portions of the model is described in U.S. Patent Publication No. 2008/0098349 for Traceability in a Modeling Environment, which is hereby incorporated by reference in its entirety.

The error class library 216 may include information on how error instances may be introduced into the IR. Specifically, the error class library 216 may store one or more templates or patterns for use in searching the IR, and one or more error templates or patterns for use in constructing a particular error being introduced in the generated code.

In an embodiment, the original IR constructed from the model may be saved, and an altered IR created. If a second class of error is to be introduced, the error injector unit 222 may operate on the altered IR. That is, the error injector unit 222 may search the altered IR, and may make further alterations to it.

The code generator 210 may utilize the one or more altered IRs to generate code having one or more introduced errors, as indicated at block 318. The code generator 210 may output the generated code 232, which includes one or more introduced errors, and the generated code may be saved to memory, such as one or more of memories 104 and 108.

For example, suppose one of the error types selected by the user is incorrect array indexing. Suppose further that the model includes an operation that indexes the 12th element of a 1×24 array. The error injector unit 222 may search the IR constructed from the model for an array, and an operation that indexes into that array. The error injector unit 222 may then alter the IR so that the IR, as altered, now indexes a different element of the array, such as the 22nd element rather than the 12th element.

The report generator 224 may generate one or more reports concerning the one or more errors introduced into the generated code, as indicated at block 320. For example, the report generator may generate a report that identifies each error introduced into the code by the error injector unit 222 and the class of the introduced error. The report may indentify each error by specifying the file of the generated code in which the error is located, e.g., model.c, and the line number of the introduced error in that file, e.g., line 254. The report may be output by the report generator, as indicated at block 322. For example, the report may be displayed on the display 120, sent to a printer for printing, and/or saved in memory, such as main memory 104 and/or persistent memory 108, as one or more electronic files or objects.

In addition, the generated code 232 may be subjected to analysis by one or more verification tools 230. More specifically, the modeling environment 200 may receive a selection of one or more verification tools that are to analyze the generated code, as indicated at block 324. A user may direct the generated code to be analyzed by one or more verification tools to see whether the selected verification tool is capable of identifying the one or more errors that were introduced into the generated code by the error injector unit 222. In an embodiment, one of the code generation options presented in the code generation option pane may be a verification option. If the verification option selected, the UI engine 204 may present a verification tool selection pane. FIG. 5 is a schematic illustration of a verification tool selection pane 500. The verification tool selection pane 500 may include a list of entries 502a-h, where each entry represents an available verification tool. A checkbox may be associated with each entry 502a-h. The user may enter a check, e.g., with the mouse 118, into the checkbox associated with one or more verification tools that are to analyze the generated code. The verification tool selection pane 500 may also include one or more command buttons, such as an OK button 504, a Cancel button 506, a Help button 508, and an Apply button 510. After checking the checkboxes for the desired verification tools, a user may select the Apply button 510 and the OK button 504 to save the selection.

Exemplary verification tools include the FlexeLint and PC-lint C/C++ static code checkers from Gimpel Software of Collegeville, Pa., the Simulink Code Inspector product from The MathWorks, Inc., the Astree run-time analyzer and other products from Absint Angewandte Informatik GmbH of Saarbruecken, Germany, the Polyspace code verifiers from The MathWorks, Inc., the Insure++ error detection tool and the Parasoft C++ test analysis tool from Parasoft Corp. of Monrovia, Calif., the DevPartner BoundsChecker runtime error checker from Micro Focus IP Development Ltd. of Berkshire, UK, and the open source Valgrind debugging and profiling tools. It should be understood that other verification tools may be used, such as proprietary, internal tools.

Each of the selected verification tools may analyze the generated code, as indicated at block 326 (FIG. 3C). The analysis of the generated code by the verification tool may include a comparison of the generated code to the model, which remained in its original form, i.e., un-modified, as indicated at block 328. Additionally or alternatively, the generated code having the one or more errors may be compared with one or more of the original, un-modified IRs of the model, as also indicated at block 328. Furthermore, code may be generated from the one or more original, un-modified IRs, and this "clean" code may be compared to the generated code having the one or more introduced errors by the verification tool, again as indicated at block 328.

Additionally or alternatively, the generated code having the one or more errors may be subject to manual code inspection. For example, one or more programmers or coders with significant experience may manually analyze the generated code in an attempt to detect the one or more introduced errors. The introduction of errors into the generated code also may be used to train programmers or coders in the art of error detection.

Each verification tool selected to analyze the generated code may provide the results of its analysis, as indicated at block 330. A user may review the results of the analysis by the one or more verification tools, and determine whether the one or more tools was able to detect the one or more errors that were deliberately introduced into the generated code by the error injection system 214. If the verification tool was able to detect the one or more introduced errors, then the verification tool may be considered to be validated at least for the class of error that the tool detected in the generated code. That is, if the verification tool successfully detects the introduced errors, it may then be deemed to be suitable for detecting such errors caused by a bug in a code generator.

In an embodiment, the error injection system 214 may obtain the output (e.g., one or more results) produced by the selected verification tool, as indicated at block 332. The error injection system 214 may review the output, and automatically determine whether or not the verification tool detected the one or more errors introduced into the generated code, as indicated at block 334. The report generator 224 may produce a report indicating whether or not the verification tool was able to detect the one or more introduced errors, as indicated at block 336. The report may be output for review by the developer, as indicated at block 338.

The error injection system 214 may provide one or more metrics regarding the errors detected by the one or more verification tools. For example, the error injection system 214 may indicate whether a designated verification tool was able to detect at least 85% of all of the errors of one or more error classes.

FIG. 6 is a schematic illustration of a computer-generated graphical model 600 having executable semantics. The model 600 may include a plurality of blocks interconnected by connection lines, such as arrows. Specifically, the model 600 may include an Inport block 602, an Outport block 604, and a plurality of constant blocks, such as an Increment (INC) constant block 606, a Limit constant block 608, and a Reset constant block 610. The model 600 may also include a Sum block 612, a Unit Delay block 614, a Switch block 616, and a relational operator block 618 that is configured to output true, e.g., 1, if the first input is not equal to the second input, and otherwise to output false, e.g., 0. The INC constant block 606 may be set to 1, the Limit constant block 608 may be set to 16, and the Reset constant block 610 may be set to 0. The model 600 may further include a subsystem block 620 for an amplifier subsystem. The amplifier subsystem may be a triggered subsystem.

The model 600 may be constructed on a model canvas 622 of a model editor 624. The model editor 624 may include a window, a menu bar 626, a toolbar 628, etc. The toolbar 628 may include a Run button 630, among other command buttons. In response to a user selecting the Run button 630, for example with the mouse 118, the simulation engine 206 may execute the model 600.

FIG. 7 is a schematic illustration of a subsystem 700 that corresponds to the Amplifier subsystem block 620 (FIG. 6). The amplifier subsystem 700 includes an Inport block 702, an Outport block 704, a Gain block 706, and a trigger block 708.

FIG. 8 is an excerpt of source code 800 generated for the model 600 by the code generator 210. The generated code 800 faithfully represents the model 600, and does not include any introduced errors. The generated code 800 may be included in a model.c file generated for the model 600, and may include a plurality of numbered lines of code. In particular, the code 800 may include an entry 802 at line 44 that generally corresponds to the sum block 612, and entry 804 at line 49 that generally corresponds to the relational operator block 618 of the model 600. The generated code 800 also includes entries 806-808 at line 60 that generally corresponds to the operation of the Gain block 706 (FIG. 7) of the Amplifier subsystem block 620. Entries 806-808 each include the symbols "<<1" which means multiply by 2, which is the gain factor of the Gain block 706. The generated code 800 also may include an entry 810 that generally represents the trigger input to the amplifier subsystem block 620 (FIG. 6).

Statement Out of Order Execution

Suppose a user wants to test whether a particular verification tool can detect that two or more operations of a model occur out of order in code generated from the model. To conduct such a test, the user may select the checkbox for entry 402a for statement out of order execution from the error selection pane 400, thereby directing the error injection system 214 to introduce at least one error from the statement out of order execution error class in code generated for the model 600 by the code generator 210.

In response to the selection of the statement out of order execution error class, the error injector unit 222 may evaluate the code as it is being generated, or after the code has been generated, for the model, and swap the order of entries 802 and 804, such that entry 804 occurs before entry 802 in the generated code having one or more introduced errors from the statement out of order execution error class.

FIG. 9 is an excerpt of automatically generated source code 900 having a statement out of order execution error introduced therein. In particular, the generated source code 900 has entry 902 at line 44 and entry 904 at line 49, where entry 902 occurs before and thus executes before entry 904 in the generated code 900. Entries 902 and 904 correspond to entries 804 and 802 (FIG. 8), respectively, of the originally generated code 800. However, in the generated code 900, the execution order of original entries 802 and 804 are swapped, e.g., reversed, thus introducing an out of execution order error. It should be understood that such generated code 900 having such an introduced error may still be compiled and executed. The generated code 900 with the introduced error, e.g., entry 804 swapped with entry 802, may be analyzed by one or more of the verification tools 230 of the verification tool suite 228, such as the Simulink Code Inspector tool. If the selected verification tool detects that entry 902 is out of order relative to entry 904, the user will have some confidence that the verification tool is capable of detecting such errors should they occur due to a bug in the code generator tool.

In an embodiment, the error injector unit 222 may introduce the one or more errors by modifying the generated source code, such as code 800. In another embodiment, the error injector unit 222 may introduce the one or more errors by modifying one or more IRs generated from the model 600 during the code generation process.

It should be understood that the verification tool may analyze the source code generated for the model with the introduced error and/or object code or an executable produced by compiling or interpreting the source code. It should be further understood that the verification tool also may analyze the model 600.

Incorrect Math Operation

Suppose a user wants to test whether a given verification tool can detect that a math operation in a model appears incorrectly in code generated for the model. In this case, the user may select the checkbox for entry 402l from the error selection pane 400, and may select "division instead of multiplication" from the drop down menu 404, thereby directing the error injection system 214 to introduce at least one error from the incorrect math operation error class in code generated for the model 600 by the code generator 210.

In response to the selection of the incorrect math operation error class, the error injector unit 222 may evaluate the code as it is being generated, or after the code has been generated, for the model. The error injector unit 222 may modify the generated code such that the symbols "<<1" at entry 806 are changed to ">>2" which means divide by 2.

FIG. 10 is an excerpt of automatically generated source code 1000 having an incorrect math operation error introduced therein. In particular, the generated source code 1000 has entry 1002 at line 60. Entry 1002 generally corresponds to entry 806 (FIG. 8) of the originally generated code 800, but with an incorrect math operation error. Specifically, the multiply by 2 operation (<<1) of the originally generated code 800, is modified to be a divide by 4 operation (>>2). The generated code 1000 having such an introduced error may still be compiled and executed. The generated code 1000 with the introduced error, e.g., a multiply by 2 being changed to a divide by 2 at entry 806, may be analyzed by one or more of the verification tools 230 of the verification tool suite 228, such as the Simulink Code Inspector tool. If the selected verification tool detects that entry 1002 has an incorrect math operator, then the user will have some confidence that the verification tool is capable of detecting such errors should they occur due to a bug in the code generator tool being used.

It should be understood that the selected verification tool may compare the model 600 to the generated code. Alternatively or additionally, the selected verification may compare the model results produced during execution of the model with code generation results produced during execution of the generated code.

Write after Write

In an embodiment, code generated for a model should not include two write operations to the same variable without a read operation occurring between the two writes. Instead, after a first write to a given variable in the generated code, the given variable should be read or otherwise utilized before a second write is performed to the given variable. Suppose a user wants to test whether a given verification tool can detect the occurrence of two writes without an intervening read in code generated from a model. In this case, the user may select the checkbox for entry 402*b* from the error selection pane 400, thereby directing the error injection system 214 to introduce one or more write after write errors in code generated for the model 600 by the code generator 210.

In response, the error injector unit 222 may look for a write operation occurring in the code generated for the model 600. The error injector unit 222 may identify entry 804 at line 49 of the generated code 800, which assigns a value to a variable of the generated code identified as "rtb_equal_to_count". The error injector unit 222 may create and insert a new entry into the generated code following the entry 804 at line 49. That is, the error injector unit may introduce a new line of code between lines 49 and 50 of the generated code 800. The new line of code introduced into the generated code 800 may perform a write to the same variable as entry 804 at line 49, i.e., to variable "rtb_equal_to_count".

FIG. 11 is an excerpt of automatically generated source code 1100 having a write after write error introduced therein. In particular, the generated code 1100 has an entry 1102 at line 50, which represent a new line of code that is not present in the originally generated code 800 (FIG. 8). In particular, generated code 1100 includes the following code statement inserted between lines 49 and 50 of the originally generated code 800 by the error injector unit 222:

rtb_equal_to_count=rtDWork.X+=1;

This newly added statement 1102 represents a second write to the variable "rtb_equal_to_count" without a read occurring between the two writes.

The generated code 1100 having such a write after write error may still be compiled by the target language compiler 209, and executed. The generated code 1100 with the introduced error, e.g., write after write to the variable "rtb_equal_to_count", may be analyzed by one or more of the verification tools 230 of the verification tool suite 228, such as the Polyspace or FlexeLint tools. If the selected verification tool detects the introduction of the second write 1102 at line 50 following the first write at line 49, then the user will have some confidence that the verification tool is capable of detecting such errors should they occur due to a bug in the code generator tool.

Uninitialized Read

An uninitialized read occurs when a read operation targets a memory location that has been allocated but has not yet been written to.

Suppose a user wants to test whether a given verification tool can detect that a uninitialized read occurs in code generated from a model. In this case, the user may select the checkbox for entry 402*c* from the error selection pane 400, thereby directing the error injection system 214 to introduce at least one uninitialized read error in code generated for the model 600 by the code generator 210.

In response, the error injector unit 222 may look for the occurrence of an entry that involves a first write to a variable. The error injector unit 222 may insert a new entry and/or modify an existing entry before the first write that includes a read of the variable. For example, the error injector unit 222 may determine that entry 810 at line 54 represents a first write to the variable rtb_equal_to_count. The error injector unit 222 may modify entry 804 at line 49 so as to introduce an uninitialized read error.

FIG. 12 is an excerpt of automatically generated source code 1200 having an uninitialized read error introduced therein. In particular, the generated code 1200 includes an entry 1202 at lines 49-51, which replaces entry 810 (FIG. 8) at line 49 of code 800. Entry 1202 of the generated code 1200 reads as follows:

```
if (rtDWork.X > 1) {
    rtb_equal_to_count = (rtDWork.X != 16);
}
```

Entry 804 (FIG. 8) at line 49 originally performed an unconditional write to the variable rtb_equal_to_count. As modified by the error injector unit 222, however, entry 1202 of automatically generated code 1200 performs a conditional write to the variable rtb_equal_to_count. In particular, the variable rtb_equal_to_count is only written if the variable rtDWork.X is greater than 1. If the variable rtDWork.X is not greater than 1, then the variable rtb_equal_to_count is not written by the modified version of the entry. This condition, when the variable rtDWork.X is not greater than 1, then results in entry 1204 at line 56 of the generated code 1200 (corresponding to entry 810 (FIG. 8) at line 54), which includes a read of the variable rtb_equal_to_count, to represent an uninitialized read.

The generated code 1200 including the uninitialized read error may still be compiled by the target language compiler 209, and executed. The generated code 1200 with the uninitialized read error may be analyzed by one or more of the verification tools 230 of the verification tool suite 228, such as the Polyspace tool. The verification tool may examine the model 600 and the generated code 1200 having the uninitialized read error introduced therein. If the selected verification tool detects the uninitialized read error in the generated code 1200, then the user will have some confidence that the verification tool is capable of detecting such errors should they occur due to a bug in the code generator tool.

It should be understood that the error injector unit 222 may make alternative or additional modifications to introduce one or more uninitialized read errors into the generated code. For example, the error injector unit 222, instead of modifying entry 804 at line 49, may remove entry 804 at line 49 entirely. This would result in entry 810 at line 54 representing an uninitialized read.

Incorrect Literals

A literal, also referred to as a constant, explicit constant, or manifest constant, is a value, such as a numeric, alphabetic, or alphanumeric value, in a model and/or in generated code. The value may be written according to the syntax of the particular language. Literals do not change in value. To the extent a model includes one or more literals, they should be accurately reproduced in code generated for the model.

Suppose a user wants to test whether a given verification tool can detect that a literal occurring in a model appears incorrectly in the generated code. In this case, the user may select the checkbox for entry 402*d* from the error selection pane 400, thereby directing the error injection system 214 to introduce at least one incorrect literal error in code generated for the model 600 by the code generator 210.

In response, the error injector unit 222 may look for the occurrence of one or more literals in the code generated for the model 600. The error injector unit 222 may identify entry 804 at line 49 of the generated code 800, which includes the literal "16," and corresponds to the Limit constant block 608. The error injector unit 222 may introduce an error in the generated code 800 by changing the literal "16" in entry 804 at line 49 to a different value, such as "20".

FIG. 13 is an excerpt of automatically generated source code 1300 having an incorrect literal error introduced therein. In particular, the generated code 1300 includes an entry 1302 at line 49, which generally corresponds to entry 804 (FIG. 8), but the literal "16" of entry 804 is changed to "20" in entry 1302.

Again, the generated code 1300 including the incorrect literal error at entry 1302 may still be compiled by the target language compiler 209, and executed. The generated code 1300 with incorrect literal error may be analyzed by one or more of the verification tools 230 of the verification tool suite 228, such as the Simulink Code Inspector tool. The verification tool may examine the model 600 and the generated code 1300 having the incorrect literal error introduced therein. If the selected verification tool detects the incorrect literal error in the generated code 1300, then the user will have some confidence that the verification tool is capable of detecting such errors should they occur due to a bug in the code generator tool.

Incorrect Data Dependency

The term data dependency may refer to the input signals, data, etc. on which a block of a graphical model operates. In the code generated for a model, one or more operations may be included that represent a given block of the model. The one or more operations should read inputs that correspond to the inputs to the given block in the model. If the one or more operations read a different input, then an incorrect data dependency error may be said to exist in the generated code.

Suppose a user wants to test whether a given verification tool can detect that an incorrect data dependency occurs in the generated code for a model. In this case, the user may select the checkbox for entry 402e from the error selection pane 400, thereby directing the error injection system 214 to introduce at least one incorrect data dependency error in code generated for the model 600.

In response, the error injector unit 222 may identify one or more operations within the generated code that correspond to a block of the model 600, and modify one or more of the inputs to the operations. For example, the error injector unit 222 may identify an entry 810 at line 54 which represents the trigger input to the amplifier subsystem block 620 of the model 600. As shown in the model 600 and in the generated code at entry 810 at line 54, the trigger input to the amplifier subsystem block 620 reads the output of the relational operator block 618. In order to introduce an incorrect data dependency error into the generated code, the error injector unit 222 may modify entry 810 at line 54 so that it reads a value in the generated code that corresponds to the output of the sum block 612 of the model 600.

FIG. 14 is an excerpt of automatically generated source code 1400 having an incorrect data dependency error introduced therein. In particular, the generated code 1400 includes an entry 1402 at line 54, which replaces entry 810 (FIG. 8). In particular, the error injector unit 222 may modify entry 810 at line 54 of the generated code 800 by replacing it with entry 1402 of generated code 1400, which reads as follows:

```
if  ((unit8_T) (1U + (uint32_T) rtDWork.X) &&
    (rtPrevZCSigState.Amplifier_Trig_ZCE != POS_ZCSIG))
```

As modified, the operation of entry 1402 now reads the output corresponding to the sum block 612, i.e., (uint8_T) (1U+(uint32_T)rtDWork.X), rather than the output corresponding to the relational operator block 618.

The generated code 1400 including the incorrect data dependency error may still be compiled by the target language compiler 209, and executed. The generated code 1400 with incorrect data dependency error may be analyzed by one or more of the verification tools 230 of the verification tool suite 228, such as the Simulink Code Inspector tool. The verification tool may examine the model 600 and the generated code 1400 having the incorrect data dependency error introduced therein. If the selected verification tool detects the incorrect data dependency error in the generated code 1400, then the user will have some confidence that the verification tool is capable of detecting such errors should they occur due to a bug in the code generator tool.

Incorrect Array Indexing

A model may include an array data type. An array data type may have a plurality of elements. Examples of arrays include a 10-element vector, and an N-dimension matrix. A block of a model may operate on an array, or on a particular element of an array, e.g., by indexing into the array to reach the particular element. In addition, a block of a model may perform one or more operations and the results of the one or more operations may be an array. If the code generated for a model incorrectly indexes into an array either as a read or a write, then an incorrect array index error may be said to exist in the generated code.

Suppose a user wants to test whether a given verification tool can detect whether the code generated for a model incorrectly indexes into an array either during a read or write to the array. In this case, the user may select the checkbox for entry 402h from the error selection pane 400, thereby directing the error injection system 214 to introduce at least one incorrect array indexing error in code generated for the model 600.

In response, the error injector unit 222 may identify one or more operations within the generated code that read or write to an array, and modify those one or more operations to change the array indexing. For example, the input to the amplifier subsystem block 620 of the model 600 is a 3-element array, and the output of the subsystem block 620 is also a 3-element array. The error injector unit 222 may locate the portion of the generated code that corresponds to the input and/or output of the amplifier subsystem block 620, and change the array indexing. For example, entry 806 at line 60 and entries 807 at line 61 and 808 at line 62 correspond to operations performed by the subsystem block 620 and, more particularly, by the Gain block 706 of the subsystem 700. Entry 806 at line 60 operates on the first element, rtU.Input [0], of the input to the amplifier subsystem block 620, and generates the first element, rtY.Output[0], of the output of the amplifier subsystem block 620. Entry 807 at line 61 operates on the second element, rtU.Input[1], of the input, and generates the second element, rtY.Output[1], of the output. Entry 808 at line 62 operates on the third element, rtU.Input[2], of the input, and generates the third element, rtY.Output[2], of the output.

To introduce an incorrect array indexing error into the generated code for the model 600, the error injector unit 222 may modify one or more of entries 806-808 corresponding to lines 60-62.

FIG. 15 is an excerpt of automatically generated source code 1500 having an incorrect array indexing error introduced therein. In particular, the error injector unit 222 may modify entries 806-808 (FIG. 8) by replacing them with entries 1502-1504 at lines 60-62 of generated code 1500. Entries 1502-1504 read as follows:

```
rty.Output[0] = rtU.Input[2] <<1;
rty.Output[1] = rtU.Input[1] <<1;
rty.Output[2] = rtU.Input[0] <<1;
```

As shown, generated code 1500 has been modified so that the first output element, rty.Output[0], instead of being a function of the first input element, rtU.Input[0], is now a function of the third input element, rtU.Input[2]. In addition, the third output element, rty.Output[2], instead of being a function of the third input element, rtU.Input[2], is now a function of the first input element, rtU.Input[0]. Such an introduced error may not be detected by a static analyzer, as the code including the introduced errors may compile, link and be executed.

The generated code 1500 with the incorrect array indexing errors may be analyzed by one or more of the verification tools 230 of the verification tool suite 228, such as the Simulink Code Inspector and/or the Valgrind tools. The verification tool may examine the model 600 and the generated code 1500 having the incorrect array indexing errors. If the selected verification tool detects the incorrect array indexing errors in the generated code 1500, then the user will have some confidence that the verification tool is capable of detecting such errors due to a bug in the code generator tool.

Incorrect Sample Time

A model may include portions whose blocks are sampled at different rates. For example, a model may include a first portion whose blocks are sampled at a fast rate, and a second portion whose blocks are sampled at a slow rate. A user or developer may specify the sampling rate of the blocks of the model. Such models may be referred to as multi-rate models. Specific transition blocks, such as the Rate Transition blocks available in the Simulink product, may be used to connect portions of a model operating at different rates. Code may be generated for multi-rate models. For example, the portions of the model that operate at different rates may be mapped to different rate grouped functions of the generated code. If the code for a block sampled at the slow rate is included in the fast rate grouped functions, then an incorrect sample time error may be said to exist in the generated code.

FIG. 16 is a schematic illustration of a multi-rate model 1600. The model 1600 includes a first region 1602 that operates at a first rate, and a second region 1604 that operates at a second rate. The first region 1602 includes a first Inport block 1606, and an Integrator block 1608. The second region 1604 includes a second Inport block 1610, a first subsystem block 1612, a second subsystem block 1614, a Sum block 1616, a first Outport block 1618, and a second Outport block 1620. A Rate Transition block 1622 connects the first region 1602 to the second region 1604. The blocks of the first region 1602 may be sampled at a slow rate, e.g., every 2.0 seconds (s), while the blocks of the second region 1604 may be sampled at a fast rate, e.g., every 1.0 s.

FIG. 17 is a schematic, partial illustration of code 1700 generated for the multi-rate model 1600. The generated code 1700 includes a first section 1702, which includes lines 33-66, that corresponds to the fast rate region 1604 of the model 1600. The generated code also includes a second section 1704, which includes lines 68-77, that corresponds to the slow rate region 1602 of the model 1600. The first section 1702 includes an entry 1706 at line 54 that corresponds to the Sum block 1616 of the fast rate region 1604 of the model 1600. The first section 1702 is associated with a function "rtwdemo_mrmtbb_step0 ( )", while the second section 1704 is associated with a function "rtwdemo_mrmtbb_step 1 ( )".

Suppose a user wants to test whether a given verification tool can detect the occurrence of an incorrect sample time error in the generated code for a model. In this case, the user may select the checkbox for entry 402f (FIG. 4) from the error selection pane 400, thereby directing the error injection system 214 to introduce at least one incorrect sample time error in code generated for the model 1600.

In response, the error injector unit 222 may identify one or more entries of code in a section operating at a first sample rate that can be moved to a section operating at a second sample rate. By moving such an entry, the error injector unit 222 may introduce an incorrect sample time error into the generated code.

FIG. 18 is an excerpt of automatically generated source code 1800 having an incorrect sample time error introduced therein. The generated code 1800 includes a first section 1802, which includes lines 33-65, corresponding to the fast rate region 1604 of the model 1600, and a second section 1804, which includes lines 67-77, corresponding to the slow rate region 1602 of the model 1600. Entry 1706 (FIG. 17), which had occurred in the first section 1702, is moved by the error injector unit 222. In particular, in the generated code 1800, there is an entry 1806 at line 76 that corresponds to the Sum block 1616 of the model 1600. Entry 1806, however, is in the second section 1804 and part of the "rtwdemo_mrmtbb_step1 ( )" function, which corresponds to the slow rate region 1602 of the model 1600, even though the Sum block 1616 is located in the fast rate region 1604 of the model 1600.

The generated code 1800 including the incorrect sample time for the code corresponding to the Sum block 1616 may still be compiled by the target language compiler 209, and executed. The generated code 1800 with incorrect sample time error may be analyzed by one or more verification tools 230 of the verification tool suite 228, such as the Simulink Code Inspector and the Polyspace tools. The verification tool may examine the model 1600 and the generated code 1800 having the incorrect sample time error introduced therein. If the selected verification tool detects the incorrect sample time error in the generated code 1800, then the user will have some confidence that the verification tool is capable of detecting such errors should they occur due to a bug in the code generator tool.

Unprotected Multi-Task Access

The code generated for a multi-rate model, such as model 1600 (FIG. 16), may implement multiple tasks, such as a first task for implementing the functionality of the slow rate region 1602, and a second task for implementing the functionality of the fast rate region 1604. The generated code may include one or more synchronization points that control the transfer of data between the two tasks, for example through locks or other mechanisms. In particular, the generated code 1700 (FIG. 17) includes an entry 1706 at lines 44-45 that implements a synchronization point. However, if data is transferred between different tasks without utilizing the one or more synchronization points, an unprotected multi-task error may be said to occur.

Suppose a user wants to test whether a given verification tool can detect the occurrence of an unprotected multi-task access in code generated for a model. In this case, the user may select the checkbox for entry 402i from the error selection pane 400, thereby directing the error injection system 214 to introduce at least one unprotected multi-task access error in code generated by the code generator 210.

In response to the selection of the unprotected multi-task access error class, the error injector unit 222 may evaluate the code as it is being generated, or after the code has been generated, for the model 1600. The error injector unit 222 may modify the generated code, for example by removing line 44 of the generated code 1700, which controls when the "rtDWork.RateTransition_Buffer0" variable is read. Alternatively, the error injector unit 222 may modify line 44 to read as follows:

if ((rtM->Timing.RateInteraction.TID0_1==0)) {
thereby altering the code representing the synchronization point.

The generated code with the one or more unprotected multi-task access errors may be analyzed by one or more verification tools 230 of the verification tool suite 228, such as the Polyspace or Simulink Code Inspector tools. If the selected verification tool detects the introduction of the error, then the user will have some confidence that the verification tool is capable of detecting such errors should they occur due to a bug in the code generator tool.

Missing Type Cast

Data type refers to the way in which numbers are represented in computer memory. Different representations of numbers provide different precision, dynamic range, performance and memory usage. The modeling environment 200 may support the specification of various data types for signals and block parameters. Exemplary data types include: double-precision floating point (double), signed 8-bit integer (int8), unsigned 8-bit integer (uint8), signed 32-bit integer (int32), and unsigned 32-bit integer (uint32), among others. Data types of signals and block parameters may be specified within a model, for example by the user. Data types also may be inherited from other signals, blocks or other elements of the model. Code may be generated for a model, and the generated code may represent the signals and block parameters of the model according to the data types specified in the model. If the data type for a signal or block parameter in the generated code differs from the data type specified in the model for that signal or block parameter, then a missing type cast error is said to exist in the generated code.

FIG. 19 is a schematic illustration of a graphical model 1900. The model 1900 includes first and second Inport blocks 1902, 1904, a Sum block 1906, a first Data Type Conversion block 1908, a second Data Type Conversion block 1909, and an Outport block 1910. The signals output by the two Inport blocks 1902, 1904, and by the Sum block 1906 are specified to be represented as signed 32-bit integer (int32) values. The signal output by the first Data Type Conversion block 1908 is specified to be represented as a signed 8-bit integer (int8) value. The signal output by the second Data Type Conversion block 1909 and received by the Outport block 1910 is specified to be represented as an int32 value.

FIG. 20 is a partial schematic illustration of code 2000 generated for the model 1900. The generated code 2000 may correspond to a header file. The generated code 2000 includes entries 2002 and 2004, at lines 39 and 40, specifying that the values corresponding to the two Inport blocks 1902, 1904 of the model 1900 are signed 32-bit integers. FIG. 21 is a partial, schematic illustration of code 2100 generated for the model 1900. The generated code 2100 may correspond to a main or .c file. The generated code 2100 includes an entry 2102 at line 39 that applies, to the value corresponding to the Outport block 1910, a specific conversion to an 8-bit integer as specified in the model 1900.

Suppose a user wants to test whether a given verification tool can detect when a data type specified in the model is missing or appears incorrectly in the generated code. In this case, the user may select the checkbox for entry 402g from the error selection pane 400, thereby directing the error injection system 214 to introduce at least one missing type cast error in code generated for a model by the code generator 210.

In response, the error injector unit 222 may evaluate the code as it is being generated, or after the code has been generated, and introduce a missing type cast error into the code. The error injector unit 222 may alter or modify the generated code to introduce a missing type cast error. For example, the error injector unit 222 may modify entry 2102 at line 39 to read as follows:

rtY.Out1=(rtU.In1+rtU.In2)

As shown, the error injector unit 222 has removed "(int8_T)" from entry 2102, thereby introducing a missing type cast error into the generated code. The generated code including the missing type cast error may still be compiled by the target language compiler 209, and executed. The generated code with missing type cast error may be analyzed by one or more verification tools 230 of the verification tool suite 228, such as the Simulink Code Inspector tool. The verification tool may examine the model 1900 and the generated code having the missing type cast error introduced therein. If the selected verification tool detects the missing type cast error in the generated code, then the user will have some confidence that the verification tool is capable of detecting such errors should they occur due to a bug in the code generator tool.

Variable Shadowing

A graphical model may include a plurality of scopes or levels. Objects, such as variables, functions and data stores, may be defined at a particular scope or level. Referring to an object by name may result in the use of the object that is closest in scope. This can cause errors if the wrong variable is being used.

Suppose a user wants to test whether a given verification tool can detect whether the code generated for a model includes a variable shadowing error. In this case, the user may select the checkbox for entry 402k from the error selection pane 400, thereby directing the error injection system 214 to introduce at least one variable shadowing error in code generated for a model.

In response, the error injector unit 222 may evaluate the code as it is being generated, or after the code has been generated, for the model, and introduce a variable shadowing error into the code. In an embodiment, the error injector unit 222 may introduce the one or more errors by modifying the generated source code, such as code 800. In another embodiment, the error injector unit 222 may introduce the one or more errors by modifying one or more IRs generated from the model 600 during the code generation process.

FIG. 22 is an excerpt of automatically generated source code 2200 having a variable shadowing error introduced therein. In particular, the generated code 2200 includes entries 2202-2205 at lines 49-52, which replace entry 804 (FIG. 8) of the originally generated code 800. This change results in the rtb_equal_to_count variable shadowing the variable of that same name as declared at entry 2206 at line 38.

It should be understood that the generated code 2200 having such an introduced error may still be compiled and executed. The generated code 2200 with the introduced error, e.g., entries 2202-2205 replacing entry 804, may be analyzed by one or more verification tools 230 of the verification tool suite 228, such as a compiler or a static code checker. If the selected verification tool detects that entries 2202-2205 represent a variable shadowing error, the user will have some confidence that the verification tool is capable of detecting such errors should they occur due to a bug in the code generator tool.

Memory Leak

Suppose a user wants to test whether a particular verification tool can detect a memory leak in code generated from a model. In this case, the error injector unit 222 may be configured to allocate memory in the generated code, but not free the allocated memory. For example, the error injector unit 222 may include a "malloc( )" function in the generated code, for example as part of an initialize function, such as a "model_initialize( )" function. Normally, such memory allocations are freed, for example in a "model_terminate( )" function. However, the error injector unit 222 may allocate memory but not free the allocated memory, thereby introducing a memory leak into the generated code. The generated code having the memory leak introduced therein may be analyzed by one or more verification tools 230, such as the Rational® Purify® dynamic software analysis tool.

In an embodiment, the class of error may be selected, e.g., by the user, based on the analysis to be performed on the generated code. For example, a user may select an error class type that should be detected by a static code analyzer, by a compiler during the compilation of the generated code, or by a dynamic analyzer. In response to the selection of an error to be detected by a static analyzer, the injected error selector 220 and the error injector unit 222 may introduce an error in which the generated code relies on C promotion rules instead of explicitly elaborating a statement with parentheses. Such an introduced error should be detected by a static code analyzer as a MISRA-C violation, even though such code is semantically and syntactically valid C code. In response to the selection of an error to be detected at a compile time, the injected error selector 220 and the error injector unit 222 may assign a constant data pointer to a non-constant data pointer. Code containing such an introduced error may compile and run successfully, but is expected to produce a warning during compilation. In response to the selection of an error to be detected by a dynamic analyzer, a run-time error, such as a memory leak, an array index out of bounds, etc., may be introduced automatically into the generated code.

In addition, the class of error that may be selected for introduction into the to generated code may relate to one or more of the optimizations performed by the code generator 210. For example, a user may select an error class relating to incorrect loop unrolling, missing arguments in inlining, incorrect strength reduction, or reuse of functions that are different, etc. For example, if the code generator optimized the generated code to inline a function that is normally,

```
{
A = var1;
B = var2;
Y = subtract(A,B)
}
Whereby sum is
double subtract(in1,in2)
{
  return in1-in2;
}
A bug in the code generator for the inlined case might be:
{
  Y = B-A;
}
``` whereby the arguments of the function are inadvertently reversed.

The number of error instances that the error injector unit 222 actually introduces into the generated code may be specified in a report produced by the report generator 224. If the error injector unit 222 was unable to introduce any errors of a given class, the report may indicate the introduction of zero errors of that error class. In addition, the error injection system 214 may issue a warning, e.g., to the user, that no errors of the specified error class were introduced into the generated code.

FIG. 23 is a schematic illustration of a report 2300 generated by the report generator. The report 2300 may conform to the HyperText Markup Language (HTML), and thus be opened in a browser application, such as the Internet Explorer browser from Microsoft Corp. The report 2300 may have other formats, such as the eXensible Markup Language (XML). The report 2300 may include an input configuration section 2302 that may include one or more entries, such as a first entry 2304, specifying the type of the one or more errors that were introduced into the generated code, e.g., an incorrect math operation. The entry 2304 may also provide further details regarding the one or more introduced errors, for example that a subtraction symbol was introduced in place of an addition symbol. A second entry 2306 of the input confirmation section 2302 may specify which verification tools were utilized to analyze the generated code, such as the Simulink Code Inspector product.

The report 2300 also may include a result summary section 2308. Section 2308 may include one or more entries for each error that was detected by the verification tool, e.g., Simulink Code Inspector. For example, the result summary section 2308 may include an entry 2310 which indicates that the verification tool located a violation in the generated code that corresponds to the introduced error. The entry may include a violation region 2311 containing information regarding the identified error, such as the portion of the generated code having the identified error. The entry 2310 also may include a hyperlink 2312 that links to another report (or to another part of the report 2300) providing further details of the analysis performed by the verification tool. By selecting the hyperlink 2312, this detailed report may be presented in the browser application.

In an embodiment, one or more components may interact with the error injection system 214 through the API 226. For example, configuration information, such as configuration information received from a user via the UI engine 204 may be passed to the error injection system 214 via the API 226. In addition, to the extent the report generator 224 is not part of the error injection system 214, information about one or more introduced errors and/or information about what errors were detected by the verification tools 230 may be returned to the report generator 224 via the API 226. Other components also may access the error injection system 214 via the API 226. Since the verification tools may produce output in different formats, it may be advantageous in an embodiment to collect results from the different tools, and map them into a canonical form. For example, one tool may produce a warning such as:

Warning 52: variable shadowing found on line 227 with variable 'foo' Another tool may produce the following warning for the same error:

Line 227 shadows the variable 'foo'

The API 226 may create a canonical form to insulate the programmer from varying or alternative outputs produced by the specific tools. For example, the output or results produced by the different tools may be collated and made accessible from the modeling environment 200 or another tool, such as the MATLAB development environment. For example, the API 226 may support the following commands from the MATLAB development environment in order to query the results generated by the tools:

results=Simulink.getCodeAnalysisResults( )
numWarnings=get(results, 'NumWarnings')
warnings=get(results, 'Warnings')
for i=1:numWarnings
   sprintf('Warning on line %d: %s: %s', warnings(i) line, . . .
    warnings(i).shortDesc, warnings(i).sourceTool);
end Despite the results coming from a plurality of tools (e.g., the FlexeLint and Parasoft C++ Test static code analysis tool) with different output representations of warnings, the output for the example above using the API 226 is consistent. Specifically, an exemplary output is shown below:

Warning on line 227: foo is shadowed: FlexeLint
Warning on line 227: foo is shadowed: Parasoft C++ Test The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, in addition to or instead of executable graphical models, the invention may be used with graphical models having executable semantics, such as models created using Architecture Analysis and Design Language (AADL), Uniform Modeling Language (UML), and/or SysML tools. In addition, the generated code may include fixed-point code to run on a fixed-point processor, or code to emulate fixed-point behavior on a floating-point processor. Therefore, it is the object of the appended claims to cover all such variations and modifications as come within the true spirit and scope of the invention.

What is claimed is:

1. A non-transitory, computer-readable storage medium with an executable program stored thereon, where the program instructs a processor to:
    access a model having executable semantics;
    generate code from the model by the processor;
    introduce one or more errors into the code generated from the model, where the one or more errors introduced into the code generated from the model are
        not present in the model, and
        are introduced by at least one of
            altering one or more in-memory intermediate representations for the model, where the one or more in-memory intermediate representations are utilized during code generation, or
            modifying the generated code; and
    analyze, by the processor, the generated code that includes the one or more introduced errors.

2. The non-transitory, computer-readable storage medium of claim 1 wherein the analyze step is performed to detect the one or more errors introduced into the generated code.

3. The non-transitory, computer-readable storage medium of claim 1, wherein the analyze step includes comparing the generated code having the one or more introduced errors to the model.

4. The non-transitory, computer-readable storage medium of claim 1, wherein the program further instructs the processor to:
    receive a class of error, wherein
        the one or more errors introduced into the generated code are of the received class.

5. The non-transitory, computer-readable storage medium of claim 4 wherein the class of error is selected from the group consisting of:
    a statement out of order execution,
    an incorrect translation of a math operation,
    a write after write,
    an uninitialized read,
    an incorrect literal,
    an incorrect data dependency,
    an incorrect sample time,
    a missing type cast,
    an incorrect array indexing,
    an unprotected multi-task access,
    a variable shadowing, and
    a memory leak.

6. The non-transitory, computer-readable storage medium of claim 5 wherein the class of error is selected by a user or programmatically.

7. The non-transitory, computer-readable storage medium of claim 1 wherein
    the generated code is source code conforming to a computer programming language.

8. The non-transitory, computer-readable storage medium of claim 7 wherein the computer programming language is selected from the group consisting of:
    C,
    C++,
    C#,
    Ada,
    SystemC,
    the Java programming language, and
    a Hardware Description Language (HDL).

9. The non-transitory, computer-readable storage medium of claim 1 wherein the analyze step is performed by a verification tool, and the executable program further instructs the processor to:
    determine whether the verification tool detects the one or more errors introduced into the generated code.

10. The non-transitory, computer-readable storage medium of claim 9 wherein the executable program further instructs the processor to:
    receive a selection of the verification tool.

11. The non-transitory, computer-readable storage medium of claim 10 wherein the selection of the verification tool is received from a user.

12. The non-transitory, computer-readable storage medium of claim 9 wherein the executable program further instructs the processor to:
    provide an Application Programming Interface (API) through which information on
        the one or more errors introduced into the generated code, the analysis performed by the verification tool, or the one or more errors introduced into the generated code, and the analysis performed by the verification tool is obtained.

13. The non-transitory, computer-readable storage medium of claim 1 wherein the executable program further instructs the processor to:

generate a report having information concerning the one or more errors introduced into the generated code, and provide the report to an output device.

14. The non-transitory, computer-readable storage medium of claim 13 wherein the information includes a location of the one or more errors introduced into the generated code.

15. The non-transitory, computer-readable storage medium of claim 1 wherein the introduce step is performed by a code generation tool, and the one or more errors simulate a bug in the code generation tool.

16. The non-transitory, computer-readable medium of claim 1, wherein the program further instructs the processor to:

execute the model to produce a set of model results; and execute the generated code having the one or more introduced errors to produce a set of generated code results, wherein the analyze step includes comparing the model results to the generated code results.

17. A method comprising:

storing a computer source program in a memory, the computer source program conforming to a first programming language;

translating by a processor coupled to the memory, the computer source program into a new format conforming to a second programming language that is different from the first programming language;

introducing one or more errors into the new format of the computer source program, where the one or more introduced errors do not exist in the computer source program; and are introduced by at least one of altering one or more in-memory intermediate representations for the computer source program, where the one or more in-memory intermediate representations are utilized during the translating, or modifying the translated source program; and analyzing the translated source program in an effort to detect the one or more introduced errors.

18. The method of claim 17 wherein the translating includes performing at least one optimization, and the one or more introduced errors relate to the at least one optimization.

19. The method of claim 17 wherein the analyzing includes comparing the computer source program to the new format in the effort to detect the one or more introduced errors.

20. The method of claim 17 wherein the analyzing is performed by a selected verification tool.

21. The method of claim 17 further comprising:

receiving a selection of an error class, wherein the one or more introduced errors belong to the selected error class.

22. The method of claim 17 wherein a number of errors are introduced into the new format, and the number of errors is user-selected or programmatically determined.

23. An apparatus comprising:

means for storing an executable model in a memory;

means for generating computer programming code from the executable model;

means for introducing one or more errors, not appearing in the executable model, into the computer programming code generated from the executable model, the one or more errors introduced by at least one of altering one or more in-memory intermediate representations for the executable model, where the one or more in-memory intermediate representations are utilized by the means for generating computer programming code, or modifying the generated computer programming code; and means for verifying the generated code, where the verifying means attempts to detect the one or more errors introduced into the generated computer programming code.

24. The apparatus of claim 23 wherein the executable model is a graphical model, a text-based model, or a combination graphical and text-based model.

25. A data processing machine comprising:

memory configured to store a system model having executable semantics, and instructions;

a processor coupled to the memory, the processor configured by the instructions stored in the memory to:

execute the system model;

generate computer programming code from the system model; and introduce an error into the computer programming code generated from the system model, where the error is not present in the system model, the error is introduced by at least of altering one or more in-memory intermediate representations for the system model, where the one or more in-memory intermediate representations are utilized during generation of the computer programming code, or modifying the generated code, and the error simulates a bug in a code generation unit.

26. The data processing machine of claim 25 wherein the system model has a plurality of portions and each portion of the system model corresponds to a different scope, and the processor is further configured to receive a designation of a given scope for the error, and introduce the error in the portion of the system model that corresponds to the given scope.

27. The data processing machine of claim 25 wherein information on the error introduced into the generated code is obtained through an Application Programming Interface (API).

28. The data processing machine of claim 27 wherein the processor is further configured by the instructions stored in the memory to:

utilize the API to obtain the information on the introduced error, and process the obtained information.

29. A method comprising:

accessing a model having executable semantics;

generating, by a processor, a first in-memory intermediate representation of the model;

modifying, by the processor, the first in-memory intermediate representation by making one or more alterations to the first in-memory intermediate representation, the modifying creating a second in-memory intermediate representation;

utilizing, by the processor, the second in-memory intermediate representation to generate code for the model, the generated code including one or more errors, where the one or more errors in the generated code
    correspond to the one or more alterations made to the first in-memory intermediate representation, and
    are not present in the model; and
analyzing, by the processor, the generated code that includes the one or more errors.

30. The method of claim 29 wherein the modifying includes:
    searching the first in-memory intermediate representation for an entry matching a pattern; and
    replacing at least a portion of the first entry matching the pattern with a second entry.

31. The method of claim 29 wherein the modifying includes:
    searching the first in-memory intermediate representation for a first entry matching a pattern; and
    adding a second entry to the first in-memory intermediate representation at, before, or after the first entry matching the pattern.

32. The method of claim 29 wherein the modifying includes
    searching the first in-memory intermediate representation for an entry matching a pattern; and
    altering the first in-memory intermediate representation at, before, or after the entry.

33. The method of claim 29 wherein the one or more errors simulate a bug in a code generator, and the analyzing includes detecting the one or more errors introduced into the generated code.

34. The method of claim 29, wherein the analyzing includes comparing the generated code including the one or more errors to the model.

35. The method of claim 29 further comprising:
    receiving a class of error, wherein
        the one or more alterations made to the first in-memory intermediate representation correspond to the received class of error.

36. The method of claim 35 wherein the class of error is selected from the group consisting of:
    a statement out of order execution,
    an incorrect translation of a math operation,
    a write after write,
    an uninitialized read,
    an incorrect literal,
    an incorrect data dependency,
    an incorrect sample time,
    a missing type cast,
    an incorrect array indexing,
    an unprotected multi-task access,
    a variable shadowing, and
    a memory leak.

37. An apparatus comprising:
    a memory storing a model having executable semantics; and
    a processor coupled to the memory, the processor configured to
        generate a first in-memory intermediate representation of the model,
        modify the first in-memory intermediate representation by making one or more alterations to the first in-memory intermediate representation, the modifying creating a second in-memory intermediate representation, utilize the second in-memory intermediate representation to generate code for the model, the generated code including one or more errors corresponding to the one or more alterations made to the first in-memory intermediate representation, the one or more errors are not present in the model, and
        analyze the generated code that includes the one or more errors.

38. The apparatus of claim 37 wherein the processor is further configured to
    search the first in-memory intermediate representation for an entry matching a pattern, and
    replace at least a portion of the first entry matching the pattern with a second entry.

39. The apparatus of claim 37 wherein the processor is further configured to search the first in-memory intermediate representation for a first entry matching a pattern, and
    add a second entry to the first in-memory intermediate representation at, before, or after the first entry matching the pattern.

40. The apparatus of claim 37 wherein the processor is further configured to
    search the first in-memory intermediate representation for an entry matching a pattern, and
    alter the first in-memory intermediate representation at, before, or after the entry.

41. The apparatus of claim 37 wherein the one or more errors simulate a bug in a code generator, and the processor is further configured to detect the one or more errors included in the generated code.

42. The apparatus of claim 37 wherein the processor is further configured to compare the generated code including the one or more errors to the model.

43. The apparatus of claim 37 wherein the processor is further configured to
    receive a class of error, wherein
        the one or more alterations made to the first in-memory intermediate representation correspond to the received class of error.

44. The apparatus of claim 43 wherein the class of error is selected from the group consisting of:
    a statement out of order execution,
    an incorrect translation of a math operation,
    a write after write,
    an uninitialized read,
    an incorrect literal,
    an incorrect data dependency,
    an incorrect sample time,
    a missing type cast,
    an incorrect array indexing,
    an unprotected multi-task access,
    a variable shadowing, and
    a memory leak.

* * * * *